(12) United States Patent
Kim et al.

(10) Patent No.: US 11,697,397 B2
(45) Date of Patent: Jul. 11, 2023

(54) WINDSHIELD WIPER

(71) Applicant: SM CHEMICAL CO., LTD. AUTOMOTIVE DIVISION, Chung Nam (KR)

(72) Inventors: Kyungsu Kim, Chung Nam (KR); Kyungjong Nam, Chung Nam (KR); Sangwoo Kim, Chung Nam (KR)

(73) Assignee: SM INDUSTRY CO., LTD. AUTOMOTIVE DIVISION, Chung Nam (KR)

( * ) Notice: Subject to any disclaimer, the term of this patent is extended or adjusted under 35 U.S.C. 154(b) by 8 days.

(21) Appl. No.: 17/474,999

(22) Filed: Sep. 14, 2021

(65) Prior Publication Data

US 2022/0097654 A1    Mar. 31, 2022

Related U.S. Application Data

(62) Division of application No. 16/556,628, filed on Aug. 30, 2019, now Pat. No. 11,142,168.

(60) Provisional application No. 62/727,388, filed on Sep. 5, 2018.

(51) Int. Cl.
   *B60S 1/38*     (2006.01)
   *B60S 1/40*     (2006.01)

(52) U.S. Cl.
   CPC ............. *B60S 1/381* (2013.01); *B60S 1/4038* (2013.01); *B60S 1/3858* (2013.01)

(58) Field of Classification Search
   CPC ....... B60S 1/381; B60S 1/4038; B60S 1/3858
   See application file for complete search history.

(56) References Cited

U.S. PATENT DOCUMENTS

| | | | |
|---|---|---|---|
| 8,347,449 B2 | 1/2013 | Genet et al. | |
| 2008/0078051 A1 | 4/2008 | Herring et al. | |
| 2009/0056049 A1* | 3/2009 | Jarasson | B60S 1/40 |
| | | | 15/250.32 |
| 2009/0158545 A1 | 6/2009 | Grasso et al. | |
| 2009/0199357 A1 | 8/2009 | Thienard | |

FOREIGN PATENT DOCUMENTS

CA    2847428 A1 *  3/2013 ............... B60S 1/38

* cited by examiner

*Primary Examiner* — Andrew A Horton
(74) *Attorney, Agent, or Firm* — Sandberg Phoenix & von Gontard PC

(57) ABSTRACT

A wiper blade assembly comprises a blade having upper and lower major surfaces, a wiper element extending from the lower major surface of the blade, a connector mounted on the upper major surface of the blade, and spoilers extending from opposite sides of the connector. The spoilers and the connector ore configured to positively engage each other. The spoiler includes a slice which will form a tear in the spoiler should the spoiler be moved axially relative to the connector to at least discourage reattachment of the spoiler should the spoiler be removed. The connector is a connector assembly comprising a connector base mountable to the blade of the wiper and an adapter which is separate from the connector base. The adapter is removably mountable to the connector base. Several different adapters are disclosed to allow the wiper assembly to be connected to different types of vehicle wiper arms.

4 Claims, 21 Drawing Sheets

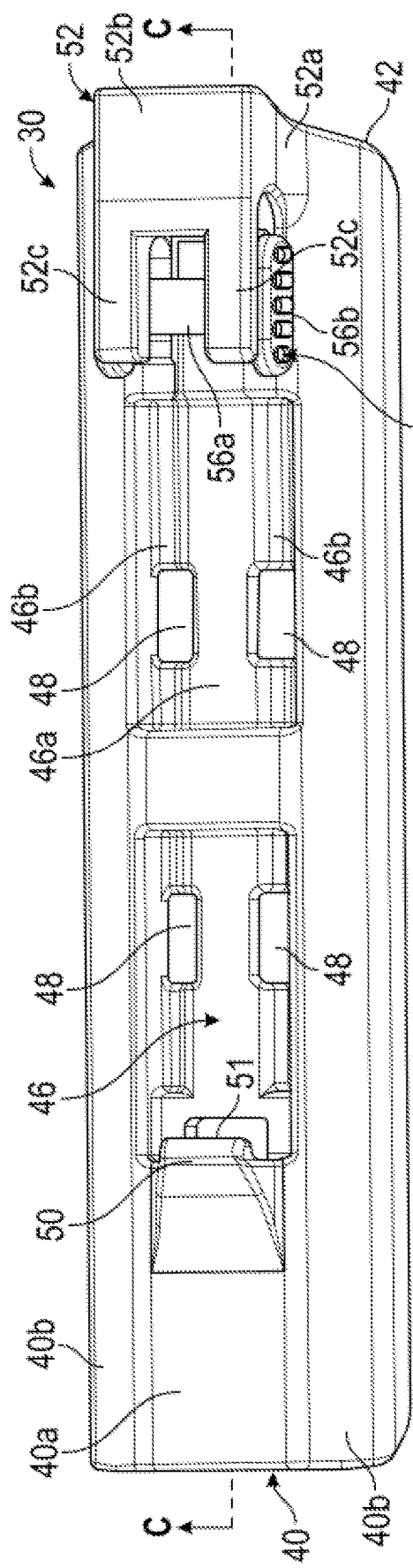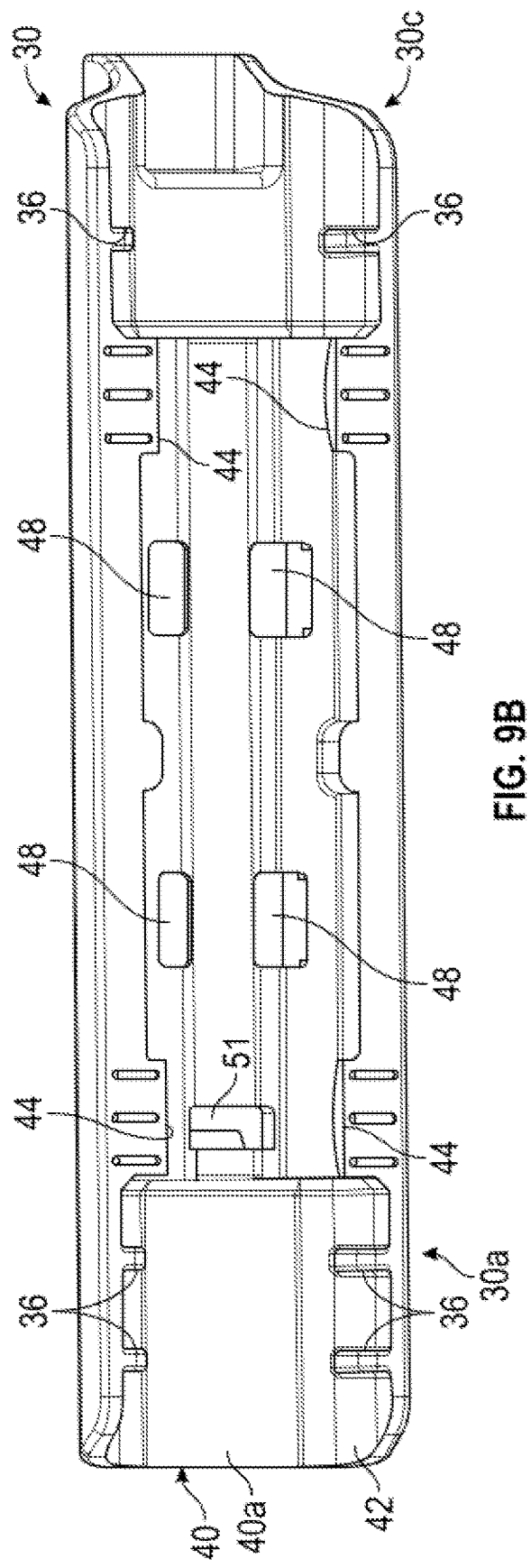
FIG. 9A
FIG. 9B

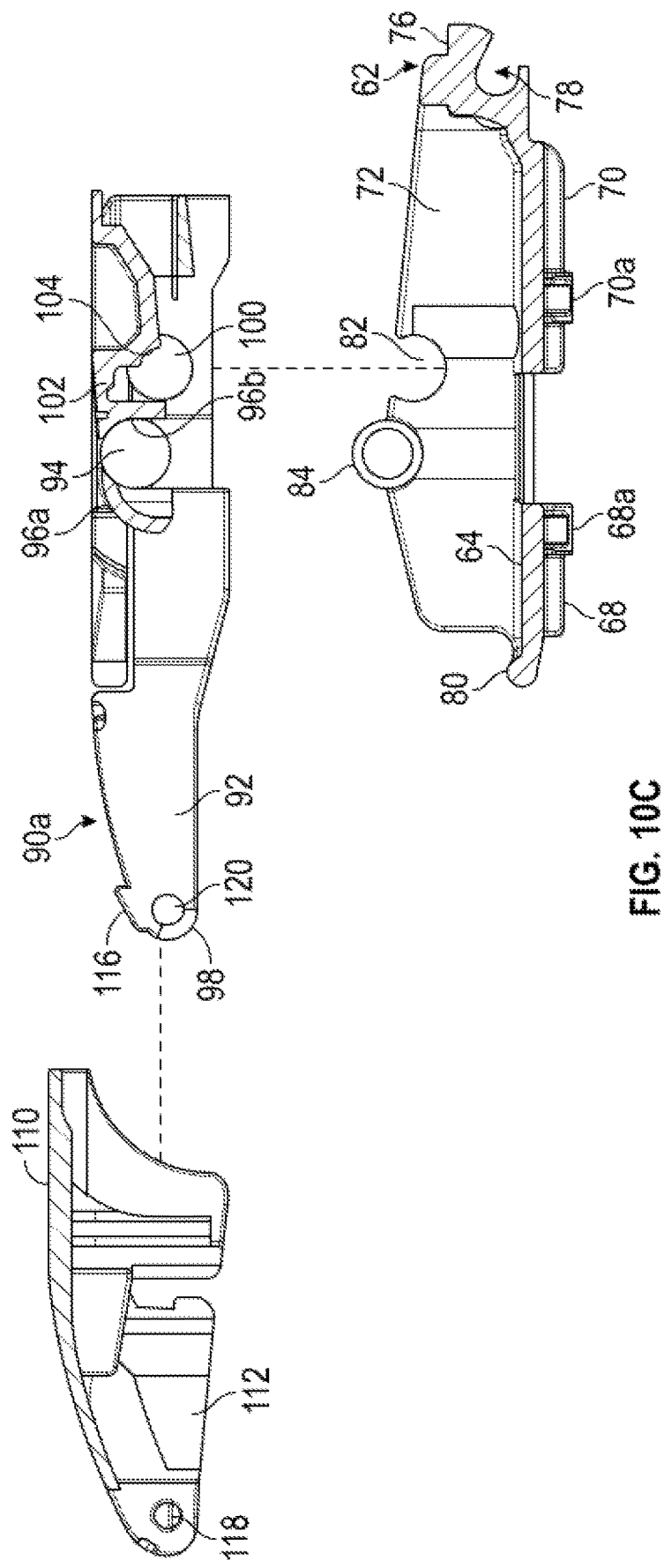

WINDSHIELD WIPER

CROSS-REFERENCE TO RELATED APPLICATIONS

This application is a divisional of application. Ser. No. 16/556,628 filed Aug. 30, 2019, which in turn claims priority to U.S. Pat. App. No. 62/727,388 filed Sep. 5, 2018 and entitled "Windshield Wiper". The contents of both said applications are incorporated herein by reference.

STATEMENT REGARDING FEDERALLY SPONSORED RESEARCH OR DEVELOPMENT

Not Applicable.

BACKGROUND

The present invention relates to windshield wiper blades, and in particular, to a system which will allow for a blade to be used with different types of connectors and to a mechanism to discourage removal of the wiper element from the wiper blade.

Wiper assemblies are mounted to a vehicle by the vehicle's wiper arm. There are several different types of connectors that are commonly used to connect wiper assemblies to the wiper arm. However, the current construction of wiper blade assemblies requires that the wiper assembly be provided with a specific connector. That is, the connector cannot be changed. It would thus be desirable to provide a wiper blade assembly in which the one of a selected number of types of connectors could be used with the wiper blade assembly.

Additionally, beam-type wiper assemblies are often provided with an air deflector or spoiler to help hold the wiper assembly against the vehicle's windscreen during high-speed travel. The spoilers can be removably secured to the connector to hold the spoiler in place. However, if an owner removes the spoiler, he may not properly replace the spoiler, which could lead to failure of the wiper blade during use. It would thus be desirable to prevent (or at least discourage) an owner from re-assembling a spoiler to a wiper blade assembly should he remove the spoiler.

BRIEF SUMMARY

Briefly stated, a wiper blade assembly is disclosed which comprises a blade having upper and lower major surfaces, a wiper element mounted to the blade to extend from the lower major surface to engage the vehicle windshield when in use, a connector mounted to the blade on the upper major surface of the blade, a first spoiler extending from a first end of the connector and a second spoiler extending from a second end of the connector.

According to an aspect of the wiper blade assembly, the connector includes sleeves which extend from opposite sides of the connector, and the spoilers each include an inner portion. The spoiler inner portion and the connector sleeve are telescopically connected. The spoiler inner end includes at least one recess on at least one edge of the spoiler inner portion, and the connector includes at least one finger extending from a wall of the connector sleeve into the recess.

According to an aspect of the wiper blade assembly, the spoiler inner portion is received within the connector sleeve.

According to an aspect of the wiper blade assembly, the spoiler includes a mounting body comprising an upper portion and a lower portion, joined by an edge portion, which in combination define an internal elongate slot. The slot is sized to receive the blade; and the at least one recess is formed in the lower portion of the mounting body.

According to an aspect of the wiper blade assembly, the wiper blade assembly includes a slice extending from the at least one recess into the spoiler; whereby, if the spoiler is moved axially along the blade away from the connector, a tear will form in the spoiler which will interfere with the ability to securely remount the spoiler to the blade.

According to an aspect of the wiper blade assembly, the at least one recess comprises at least one pair of recesses, each recess of the at least one pair of recesses being formed on opposite sides of the spoiler inner portion.

In another aspect, a connector assembly is provided for connecting a windshield wiper assembly to a wiper arm of a vehicle. The connector assembly comprises a connector base mountable to a blade of the wiper, and an adapter configured to connect to a wiper arm of a vehicle; the adapter being separate from, and removably mountable to, the connector base.

According to an aspect of the connector assembly the base includes a first capture element, a second capture element, and a lock member; the second capture element defining a slot; the lock member being movable along the slot. The adapter includes a first captured member which is engagable with the first capture element and a second engagable member which is engagable with the second capture element. The second engagable member defines a mouth which faces the slot and which is aligned with the lock member when the adapter is positioned on the connector base; the lock member and the mouth being shaped such that the lock is snappingly received in the mouth while the lock member is in the slot of the second capture element.

According to an aspect of the connector assembly, the first capture element comprises a projection extending upwardly from the main surface of the connector base and extending toward the second capture element, and wherein the first captured element comprises an axially extending projection on the adapter.

According to an aspect of the connector assembly, the first capture element and the first captured element are respectively shaped such that the adapter can pivot about the first captured element as the connected to, or removed from, the connector base.

According to an aspect of the connector assembly, the second capture element comprises opposed side walls extending upwardly from the connector base main surface, and a top surface extending between the opposed side walls, and a pair of fingers extending from an edge of the top surface toward the first capture element. The fingers are spaced apart from each other to define a gap therebetween and the fingers are spaced above the main surface to define the slot of the second capture element. The second captured element comprises a projection extending axially in a direction away from the first captured element and is sized to be received between the fingers. The mouth is positioned on a surface of the projection to be aligned with, and to generally open into, the slot when the adapter is positioned on the base.

According to an aspect of the connector assembly, the lock member comprises a bar and enlarged end members on opposite ends of the bar. The bar is sized to be received in the slot and to be received in the mouth.

According to an aspect of the connector assembly, the mouth is canted to open slightly downwardly.

According to an aspect of the connector assembly, the connector base has at least one well positioned between the first capture element and the second capture element with the well opening to an upper surface of the main surface. The adapter includes at least one slide sized to be received in the at least one well.

According to an aspect of the connector assembly, the well comprises a central portion of a first depth and side portions of a second depth with the second depth being greater than the first depth. The slide comprises a flange-like member extending downwardly from a floor of the adapter.

According to an aspect of the connector assembly, the slide further includes a finger extending downwardly from a bottom edge of the flange-like member.

According to an aspect of the connector assembly, the connector base comprises a main surface, opposed side walls extending downwardly from the main surface, and at least one inwardly extending finger on each of the side walls; the at least one finger from each side wall defining a gap with an underside of the main surface; the gap being sized to admit a support blade a wiper assembly, whereby the connector base is frictionally held to the support blade of the wiper assembly.

According to an aspect of the connector assembly, the adapter is a unitary, one-piece member; the adapter being shaped and configured to be connected to a wiper arm of a vehicle.

According to an aspect of the connector assembly, the adapter includes an adapter base and a connection member; the adapter base including an upper structure; and the connection member being pivotally mounted to the upper structure; the connection member being shaped and configured to be connected to a wiper arm of a vehicle.

According to a further aspect, a wiper blade assembly is disclosed comprising a blade having upper and lower major surfaces; a wiper element mounted to the blade to extend from the lower major surface to engage the vehicle window when in use, and the connector assembly as described above. The wiper blade assembly can be provided with a spoiler as described above.

BRIEF DESCRIPTION OF THE DRAWINGS

FIGS. 9A-B are top perspective and bottom perspective views, respectively, of a base member of the connector assembly of the wiper blade;

FIGS. 10A-C are exploded top perspective, bottom perspective, and longitudinal cross-sectional views, respectively, of a first connection adapter adapted to receive a pin-type wiper arm;

Corresponding reference numerals will be used throughout the several figures of the drawings.

DETAILED DESCRIPTION

Figure 1:
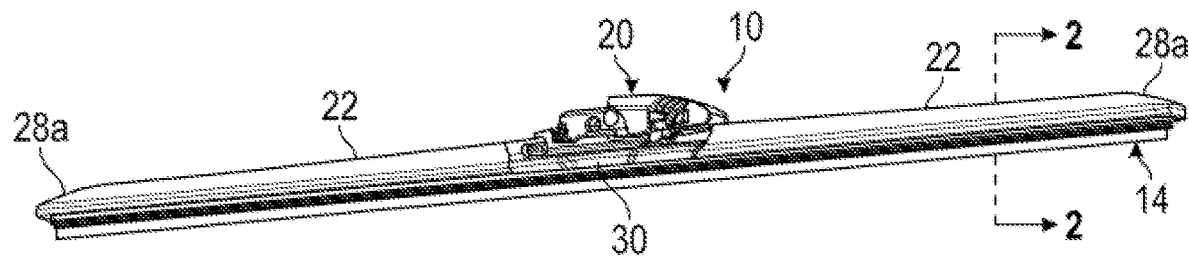
FIG. 1 is a perspective view of a wiper blade assembly.

The following detailed description illustrates the claimed invention by way of example and not by way of limitation. This description will clearly enable one skilled in the art to make and use the claimed invention, and describes several embodiments, adaptations, variations, alternatives and uses of the claimed invention, including what we presently believe is the best mode of carrying out the claimed invention. Additionally, it is to be understood that the claimed invention is not limited in its application to the details of construction and the arrangements of components set forth in the following description or illustrated in the drawings. The claimed invention is capable of other embodiments and of being practiced or being carried out in various ways. Also, it is to be understood that the phraseology and terminology used herein is for the purpose of description and should not be regarded as limiting.

Figure 2:
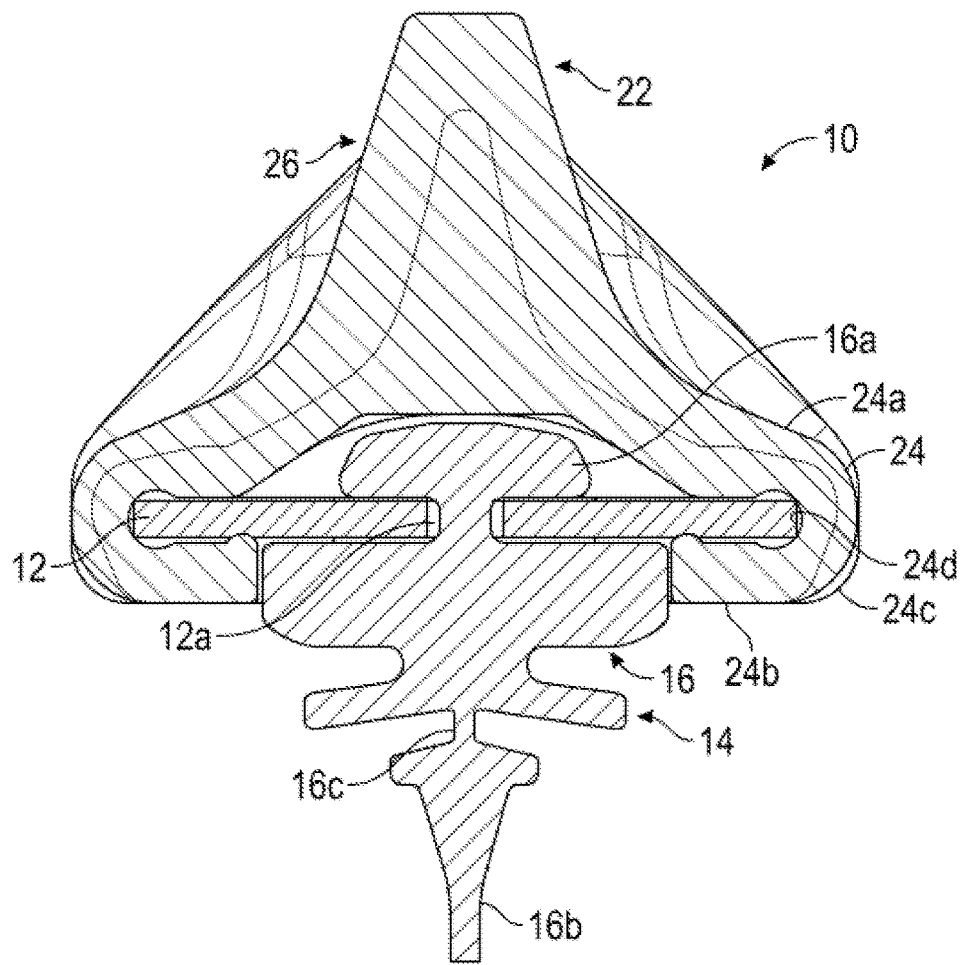
FIG. 2 is a cross-sectional view of the wiper blade assembly taken along line 2-2 of FIG. 1.
Figure 3:
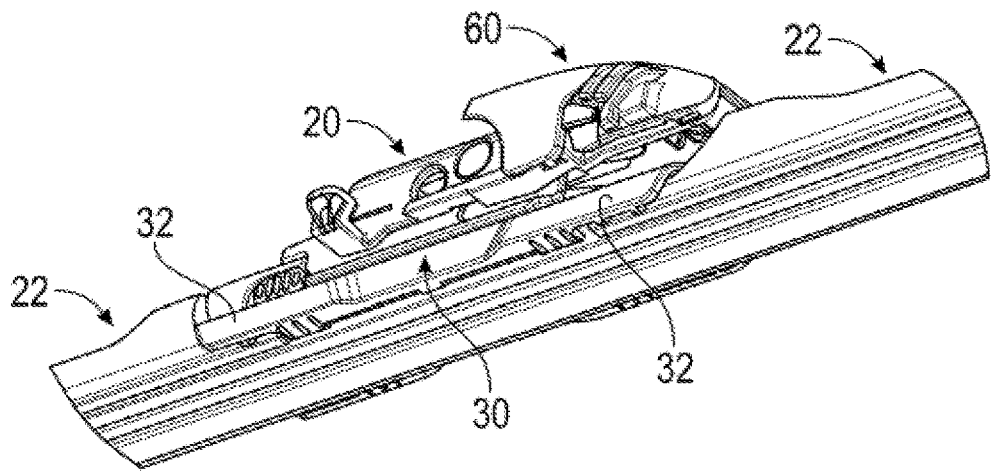
FIG. 3 is a fragmentary perspective view of the wiper blade assembly showing the connector assembly.

Beam-type wiper blade assemblies, such as the beam-type wiper assembly 10 shown in FIGS. 1 and 2, include a metal base or blade 12, which can, for example, be formed from spring metal. A wiper element 14 is mounted to the blade 12. The blade 12 can, for example, have a slot 12a extending a substantial portion of its overall length. The wiper element 14 comprises a body 16 having a T-shaped portion 16a extending upwardly from the body and a wiping portion 16b connected to the body 16 by way of a hinge member 16c. The T-shaped mounting portion has a neck which extends through the slot 12a of the blade 12 to hold the wiper element 14 in place in the blade 12. The wiper assembly 10 further includes a connector assembly 20 for securing the wiper assembly to the wiper arm of a vehicle and a pair of air deflectors or spoilers 22 which extend from opposite ends of the connector assembly 20.

As best seen in FIG. 2, the spoilers 22 each have a mounting body 24 adapted to mount the spoiler to the blade 12 and a spoiler portion 26. The mounting body comprises an upper portion 24a and a lower portion 24b joined by an edge portion 24c, which in combination define an internal elongate slot 24d. The slot 24d is sized to receive the blade 12. The inner portions 22a of the spoilers 22 are flattened and are received beneath a base 20a of the connector assembly 20. The spoiler portion 26 extends upwardly from the mounting body 24. The spoiler portion 26 is illustratively shown to be symmetrical about a vertical axis, and to have fairly steep side walls, giving the spoiler portion the shape of a truncated isosceles triangle. However, the spoiler portion can be any desired shape. The outer end 28a of the spoiler 22 can be open or closed as desired. The inner portion 28b of the spoiler 22 is shown to be a generally flat portion of the spoiler.

Figure 4:
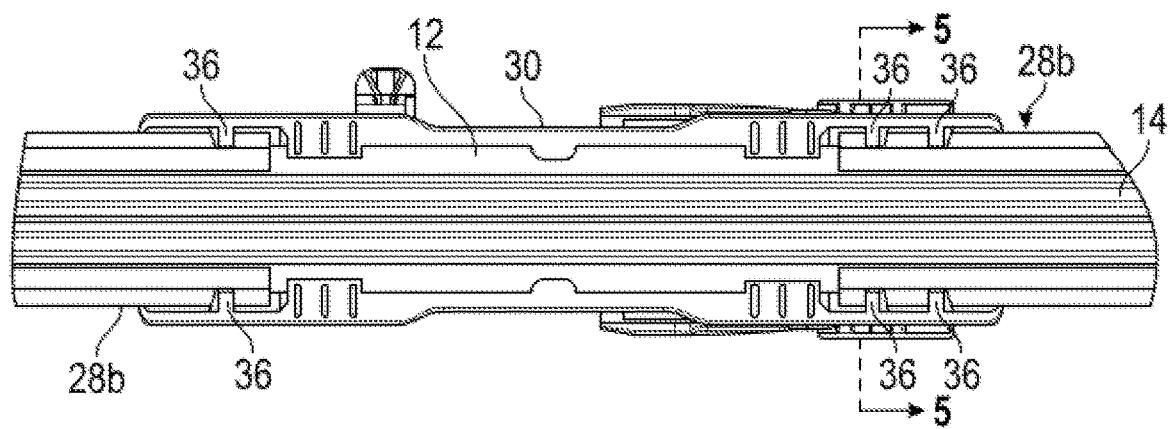
FIG. 4 is a fragmentary bottom plan view showing a tear feature of the wiper blade assembly which prevents reapplication of the spoilers to the wiper blade after removal of the spoiler.
Figure 5:
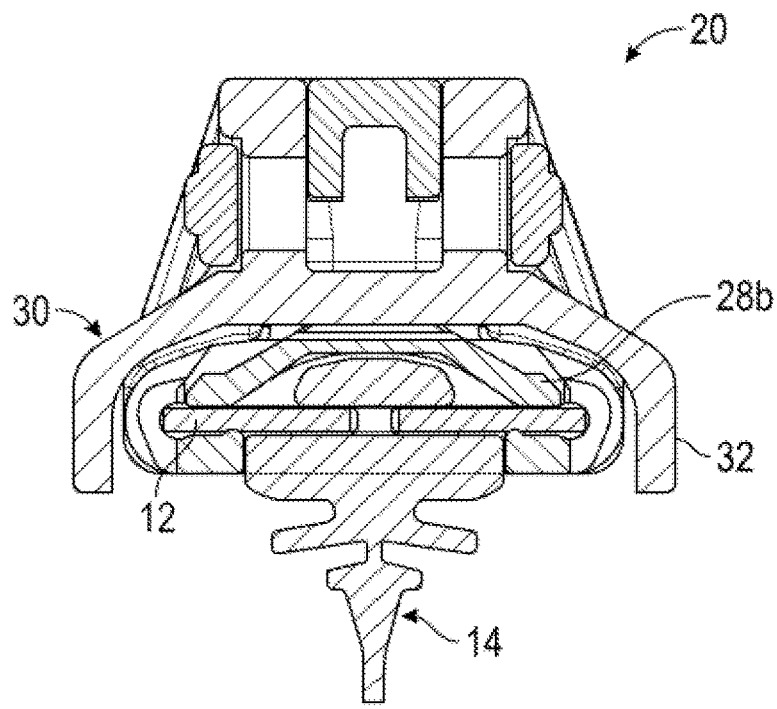
FIG. 5 is a vertical cross-sectional view of the wiper blade assembly taken along line 5-5 of FIG. 4.
Figure 6:
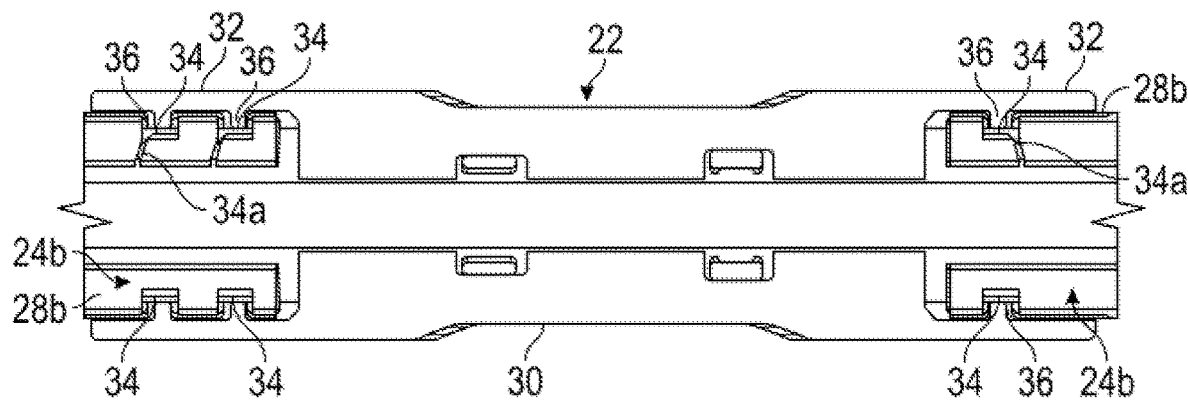
FIG. 6 is a fragmentary horizontal cross-sectional view through the tear feature of the wiper blade assembly.
Figure 7A:
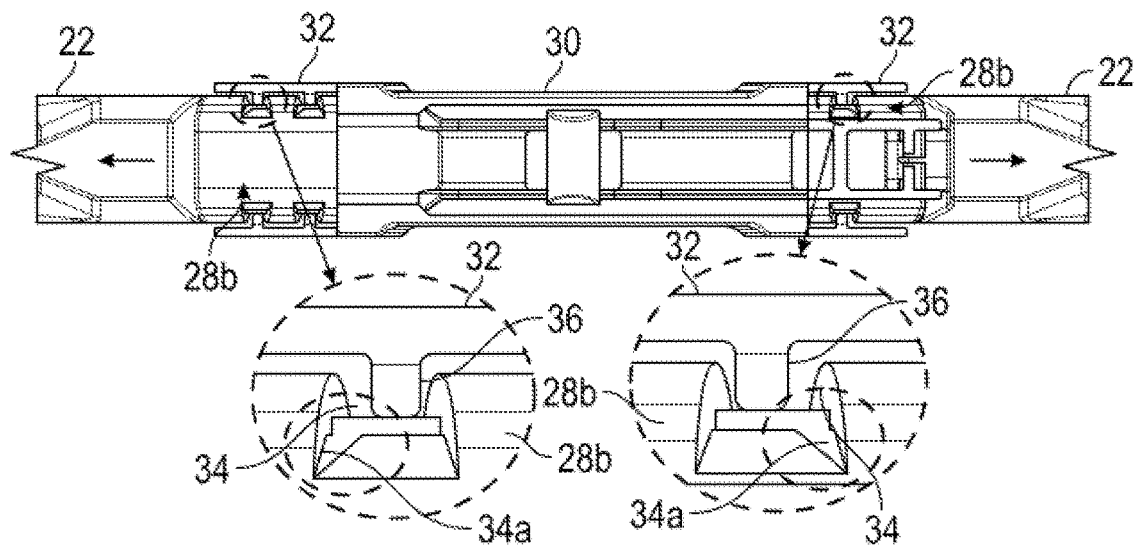
FIG. 7A is a view similar to FIG. 4 with enlarged circles showing the tear feature in detail.
Figure 7B:
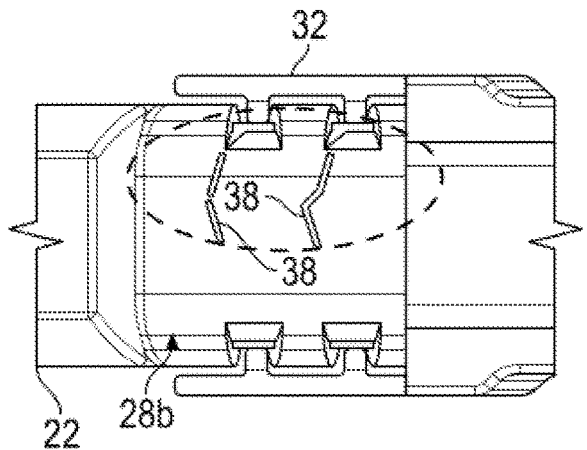
FIGS. 7B and 7C illustratively show a tear in the spoiler formed when the spoiler is removed from the wiper blade assembly.
Figure 7C:
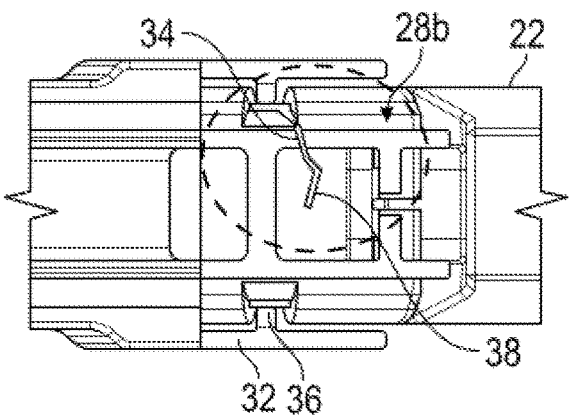
Figure 8A:
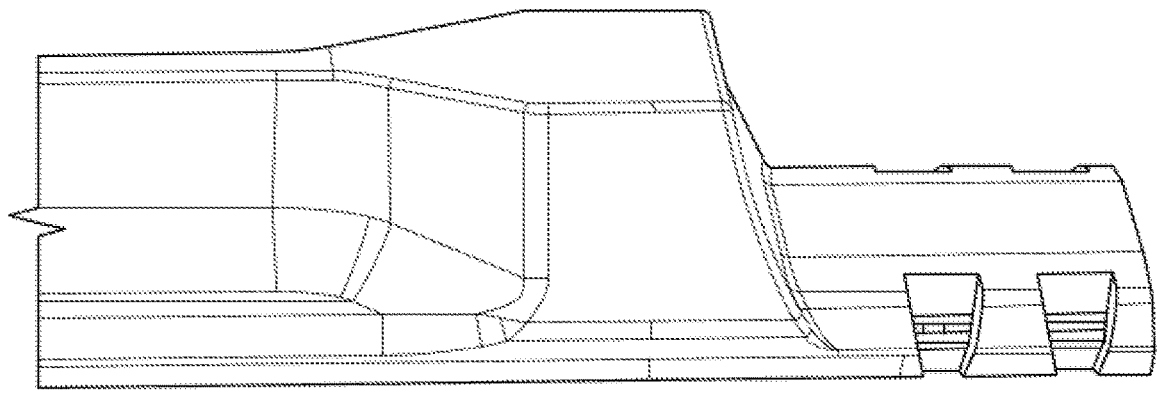
FIGS. 8A and 8B are fragmentary perspective views of the inner ends of the spoilers.
Figure 8B:
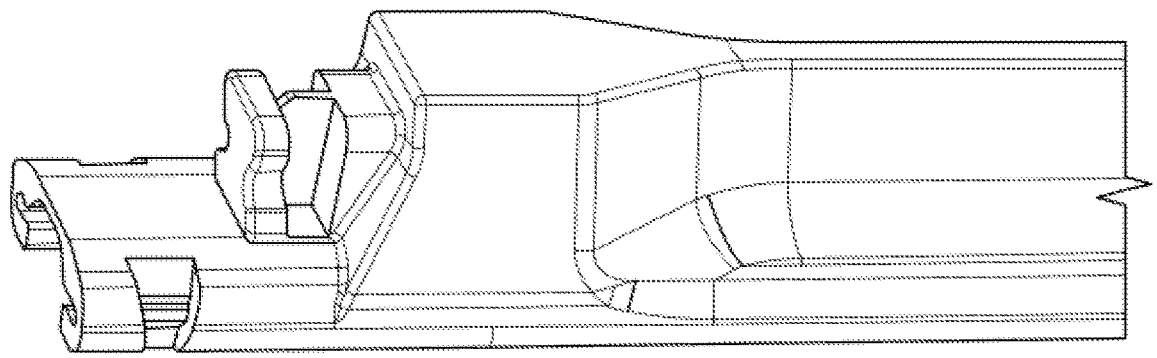

The connector assembly 20 includes a base member 30 which mounts to the blade 12 in a manner generally known in the industry. The connector base portion 30 includes opposed end sleeves 32 which extend over the inner end of portion 28b of the spoiler 22. As best seen in FIGS. 6 and 7A-C, the inner portion 28b of the spoiler 22 includes cutouts 34 in at least one side of edge inner portion 28b. Preferably, the spoiler includes cutouts 34 in both edges of the spoiler inner portion 28b. The cutouts are formed in the lower portion 24b of the spoiler mounting body 24. As seen in the Figures, the cutouts are preferably formed in pairs, with there being at least one cut-out 34 in each side edge of the spoiler inner portion. As seen in FIGS. 4 and 6, one spoiler can be provided with one pair of cut-outs, and the other spoiler can be provided with two pair of cut-outs. However, the spoilers could each be provided with just one pair of cutouts or each be provided with two pair of cut-outs. Further cutouts could be provided, if desired. Additionally, the spoiler includes cuts or slices 34a extending diagonally away from the cutouts 34.

The connector assembly base member 30 includes inwardly directed fingers 36 which extend into the spoiler cutouts 34. As can be appreciated, the engagement of the fingers 36 of the connector sleeve 32 with the recesses creates an interference fit which will help maintain the spoiler on the wiper blade assembly, and will help prevent the spoiler from sliding axially along the blade 12. However, if someone should remove the spoilers 22 from the blade 12, by pulling the spoiler axially along the blade 12, the engagement of the fingers 36 with the recesses 34 will cause the lower portion 24b of the spoiler inner portions 28a to tear at the cuts 34a, as shown illustratively by the jagged lines 38 in FIGS. 7B and 7C. The resulting tear in the spoiler inner end will prevent the user from securely remounting the spoiler to the assembly. As can be appreciated, this will discourage users from removing the spoiler 22 from the wiper assembly.

Although the inner end 28b of the spoiler 22 is shown in FIGS. 4-7C to be covered or received under the sleeve 32 of the connector base 30, the telescopic connection of the two pieces could be reversed. That is, the sleeve of the connector base could be received within or under the inner end of the spoiler. In this instance, the fingers 36 would extend outwardly from the sleeve of the connector base to engage the recesses 34 in the inner end of the spoiler. This will enable the wiper blade assembly to maintain the deterrent for removing the spoiler from the assembly.

Figure 9C:
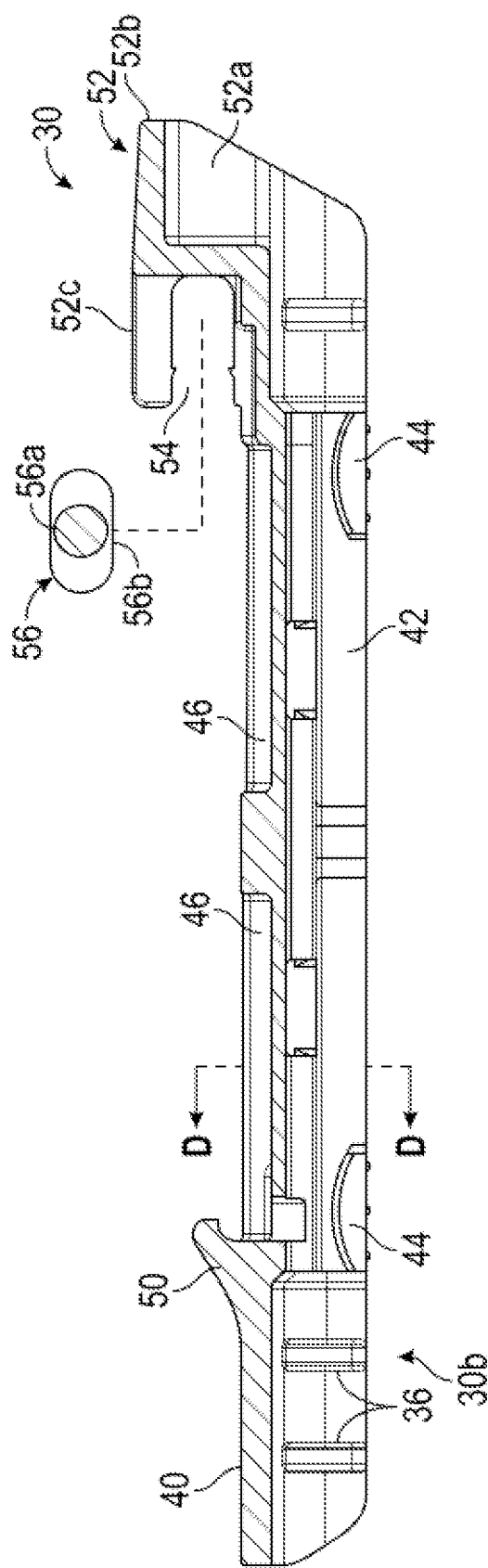
FIGS. 9C-D are longitudinal and transverse cross-sectional views of the base member taken along lines C-C of FIG. 9A and along line D-D of FIG. 9C, respectively, with FIG. 9C being an exploded view of the base member.
Figure 9D:
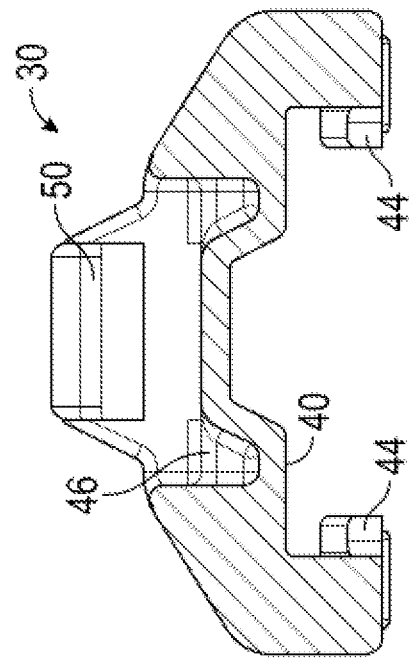
Figure 10A:
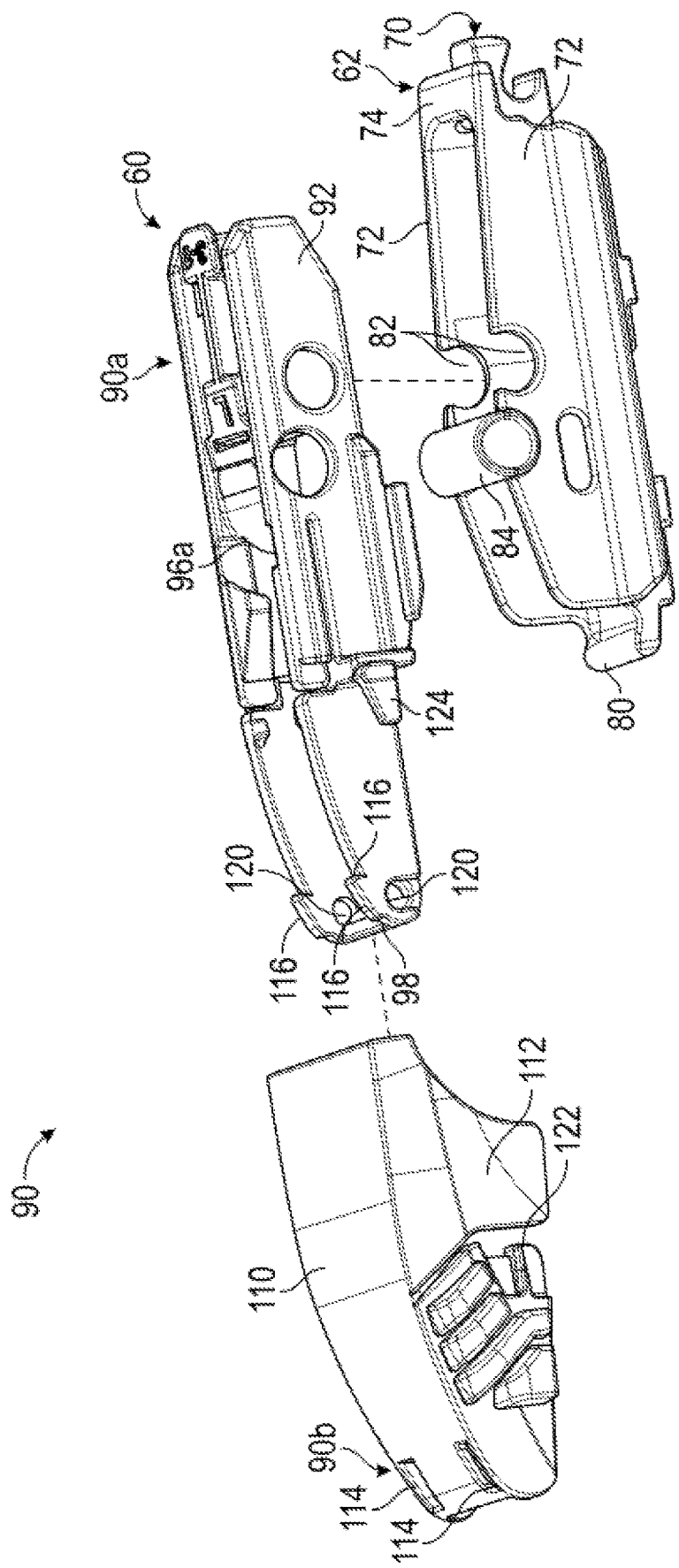
Figure 10B:
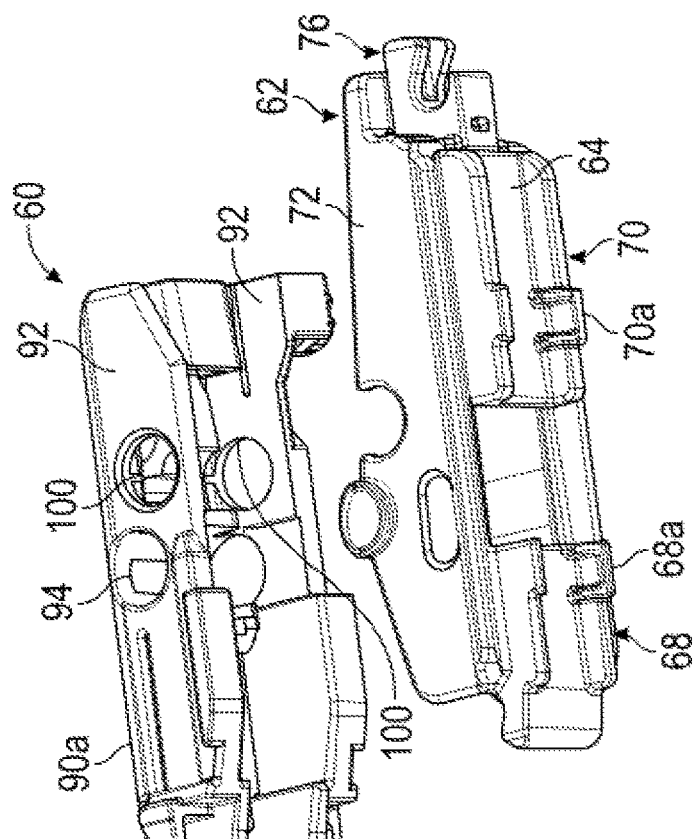
Figure 10B:
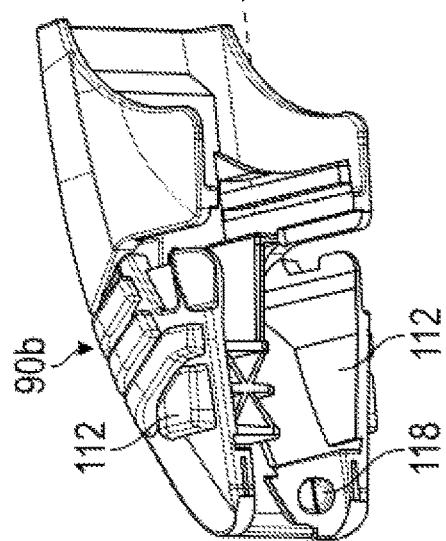

The base member 30 of the connector assembly 20 is shown in more detail in FIGS. 9A-C. The base member 30 can be defined as including a central section 30a, a first end 30b and a second end 30c. The base member 30 includes a main surface 40 having a flat central portion 40a and sloping side portions 40b. Side walls 42 depend from opposite long edges of the main surface and extend the length of the base member. Fingers 44 project inwardly from the bottom of the side walls 42. As shown, the each side wall 42 preferably includes two fingers 44, and the fingers of the two side walls are aligned with each other. The fingers 44 and the main surface central portion 40a together define a slot which allows for the base 30 to be slidingly received on the top surface of the blade 12. The fingers 36 which engage the spoiler cutouts 34 can be seen to extend generally vertically the height of the side walls 42.

The central portion 30a of the base member defines a pair of wells 46. As seen, the wells 46 each have a central section 46a and deeper side sections 46b. A pair of axially extending aligned slots 48 is formed in each of the wells 46. The slots 46 extend generally the width of the side sections of the well, and take in a portion of a wall defining an inner surface of the well side portion.

The first end 36b of the base member includes a forward capture element 50 defined by a member which slopes upwardly from the main surface 40 at the rear of the first end and which extends slightly over the well 46 at the forward end of the central section of the base member 30. The forward capture element 50 has a width generally equal to the width of the central portion 40a of the main surface 40. As seen, a transversely extending slot 51 is formed in the forward well 46 just behind the forward capture element 50.

The second end 36c includes a second capture element 52 defined by a pair of opposed walls 52a which extend upwardly from the sides of the main surface central section 30a, a top surface 52b which extends between the upper ends of the side walls 52a, and a pair of spaced apart fingers 52c which extend forwardly from the top surface 52b. As seen in FIG. 9C, the rear capture element 52 defines a rearwardly extending slot 54. A lock member 56 is received in the slot 54 to be movable axially along the slot 54. As shown, the lock member 56 includes a central bar 56a and enlarged ends 56b. The bar 56a has a length such that that inner surfaces of the enlarged ends 56b will be adjacent the outer surfaces of the walls 52a of the rear capture member 52.

The provision of a base member 30 for the connector assembly 20 allows for different connection adapters to be associated with an individual wiper blade, and thus, a connection adapter can be selected for the blade based on the type of wiper blade connection the vehicle has.

Figure 11A:
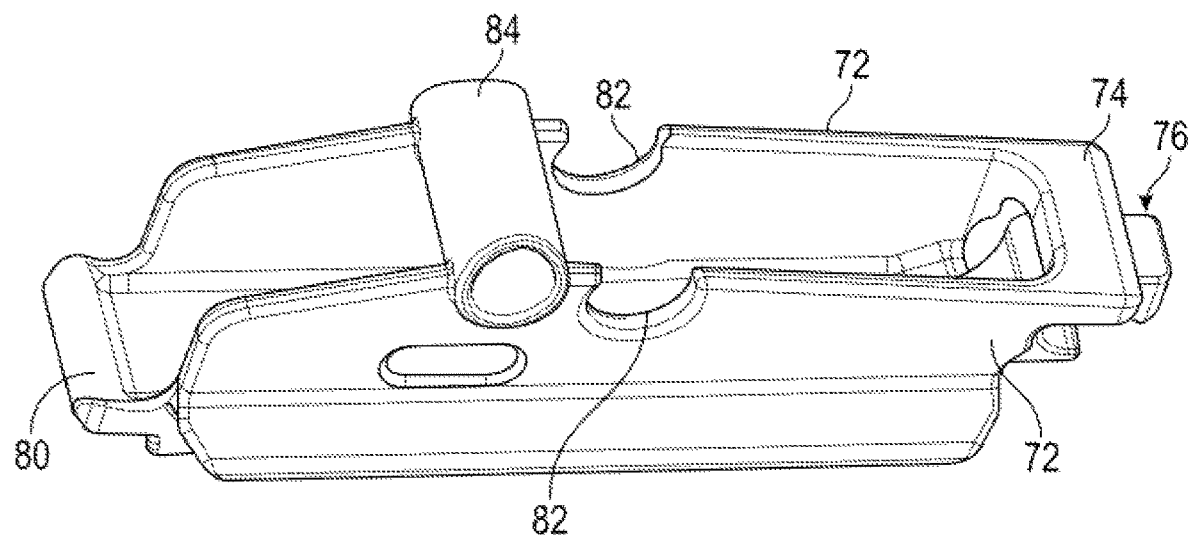
FIGS. 11A and 11B are top and bottom perspective views, respectively, of an adapter base of the first connection adapter.
Figure 11B:
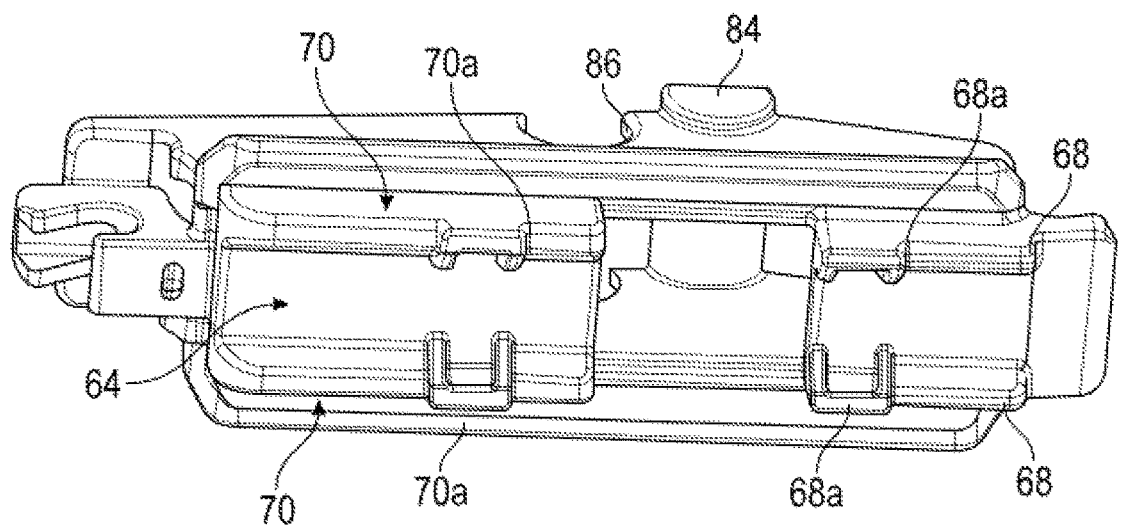
Figure 12:
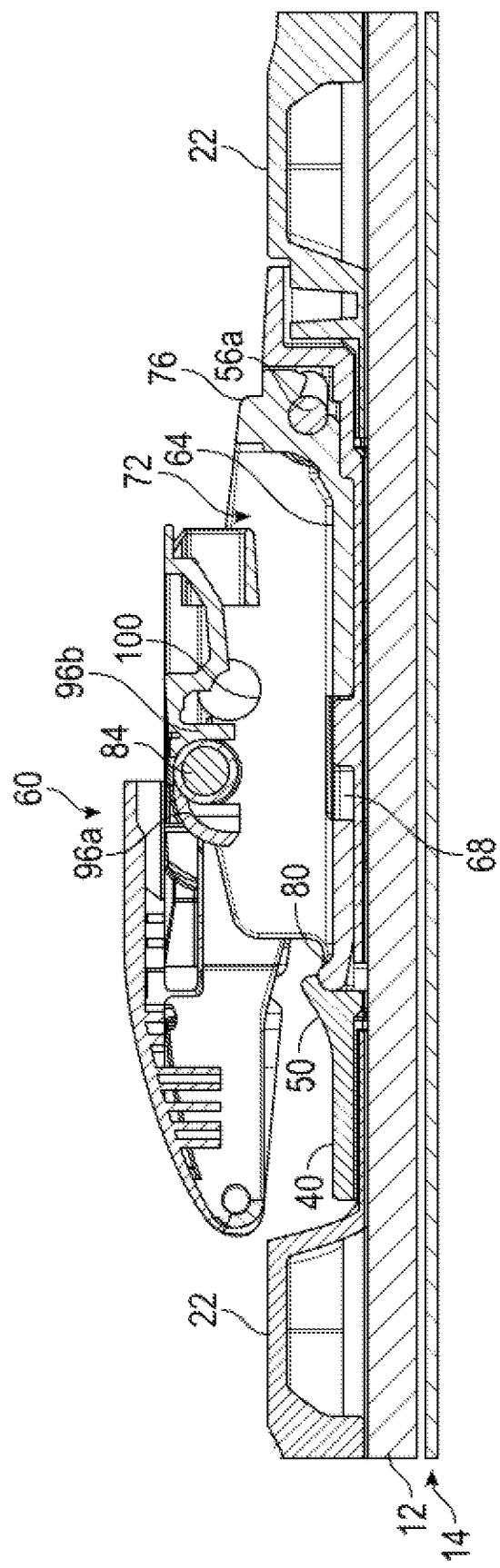
FIG. 12 is an enlarged cross-sectional view of a wiper blade with the first connection adapter mounted to the connection base.
Figure 13A:
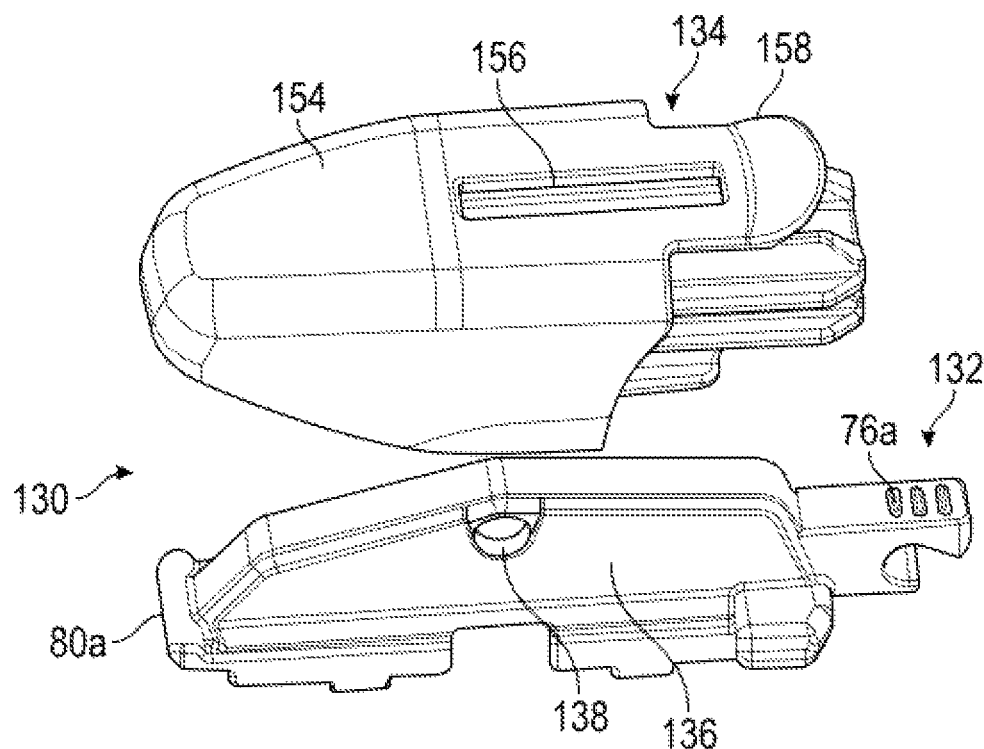
FIGS. 13A-C are exploded top, bottom, and front perspective views of a second connection adapter intended to receive a bayonet-type wiper arm.
Figure 13B:
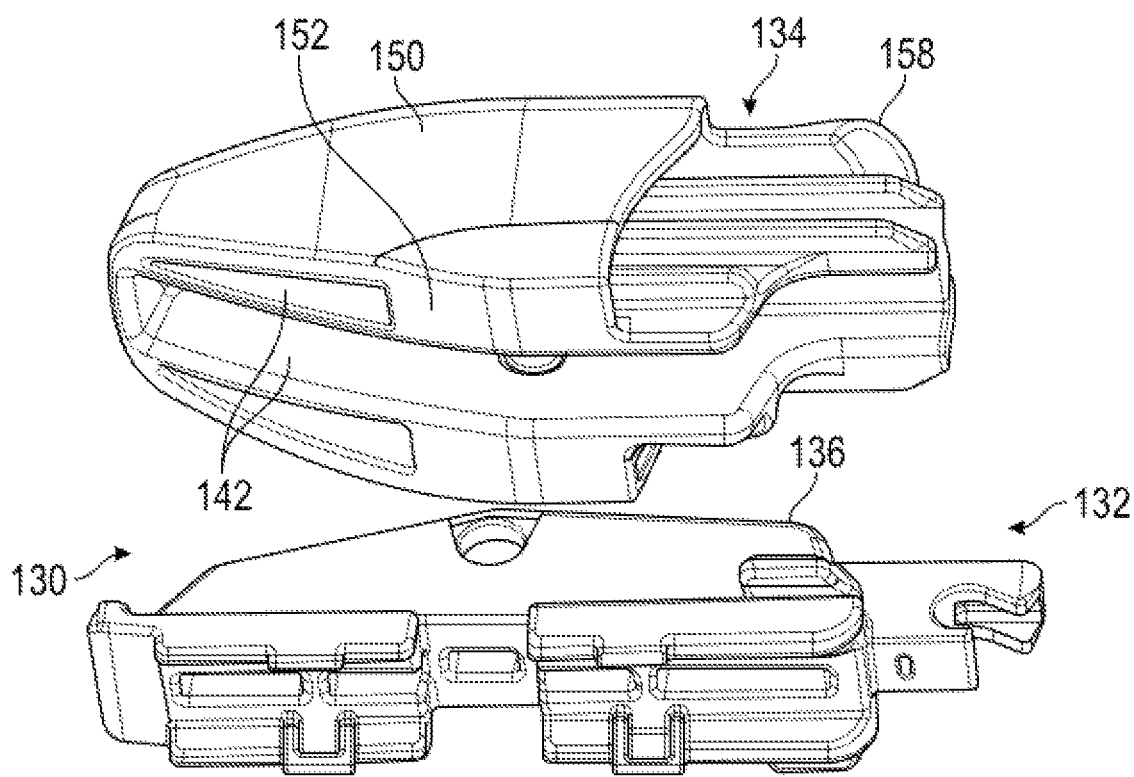
Figure 13C:
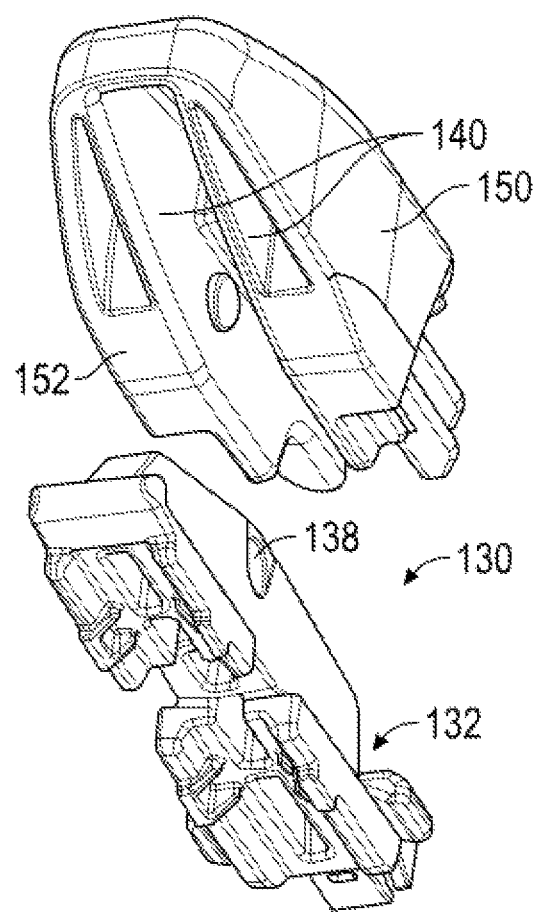
Figure 13D:
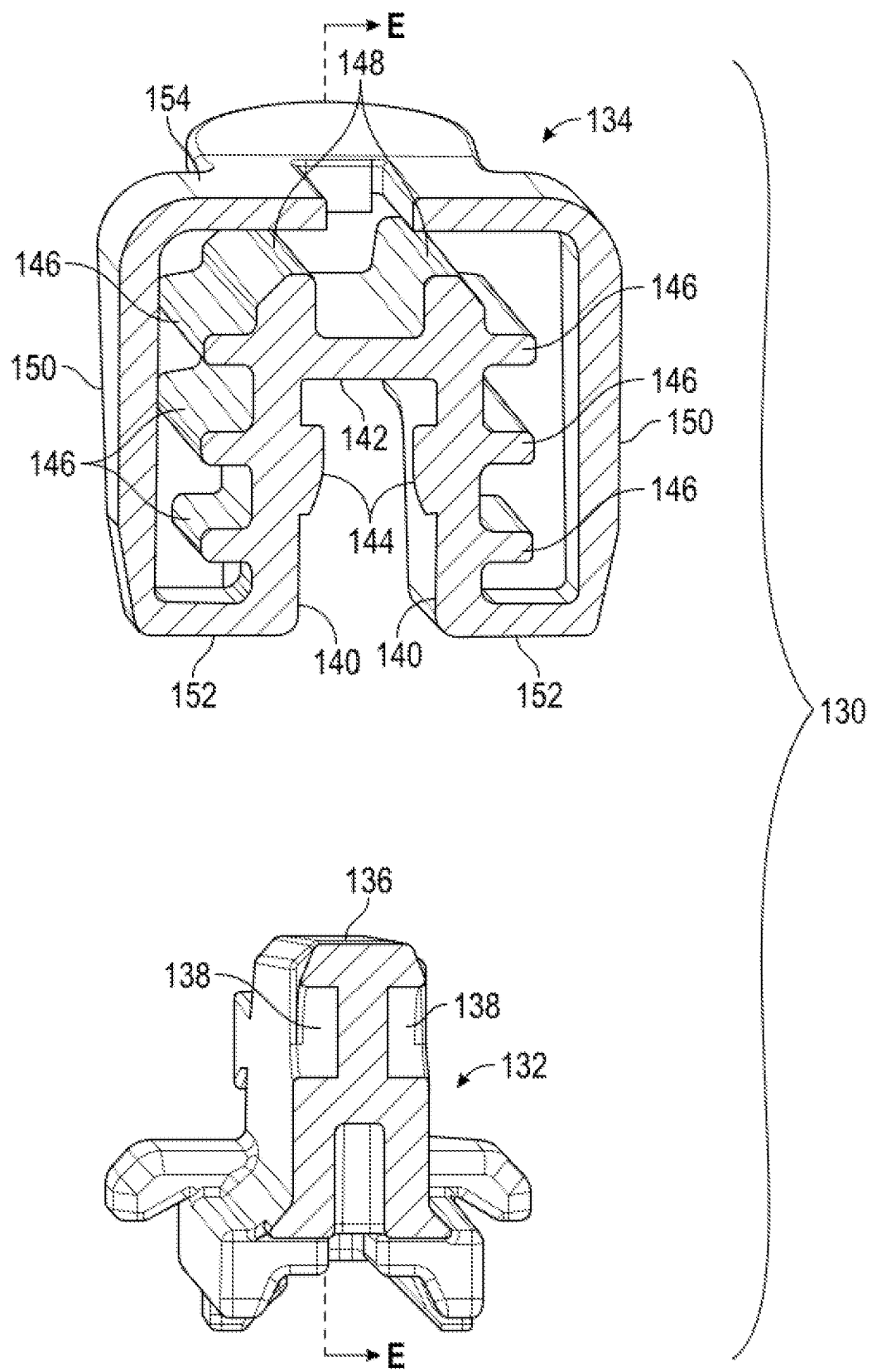
FIGS. 13D-E are exploded cross-sectional views of the second connection adapter taken at right angles to each other.
Figure 13E:
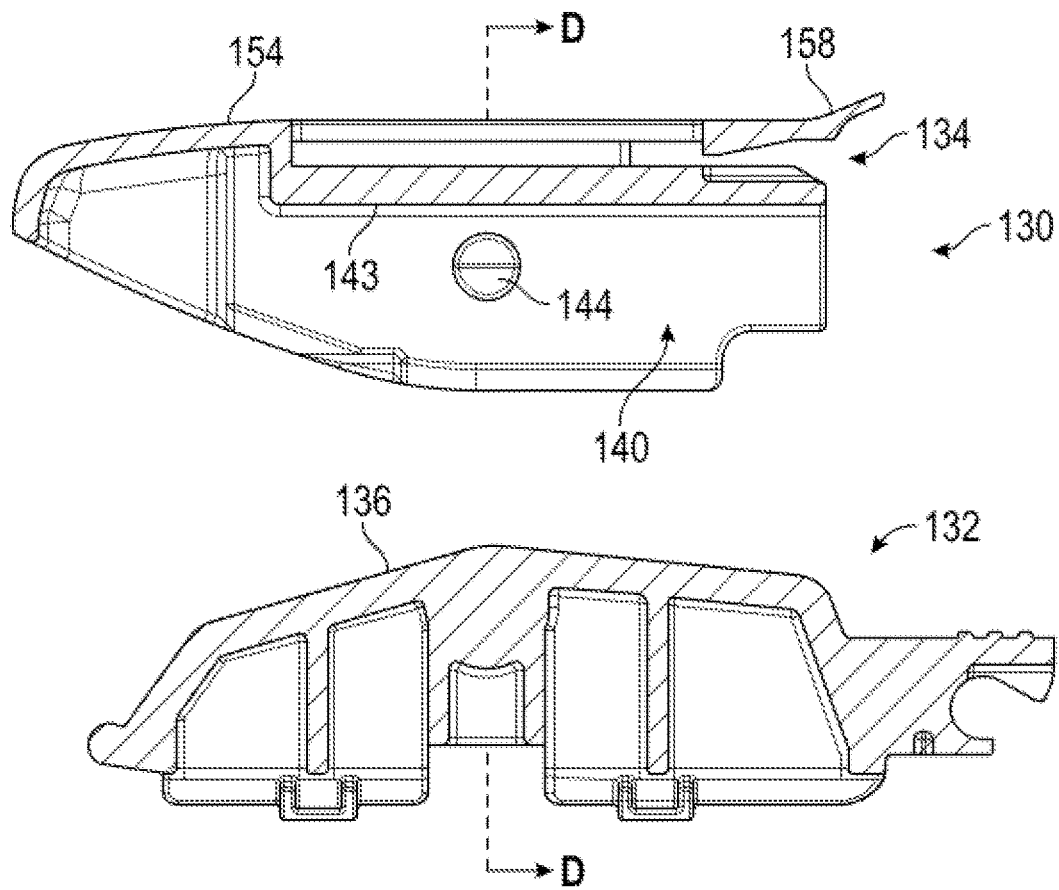

A first adapter 60 is shown in FIGS. 10A-C and 11. The first connection adapter includes an adapter base 62 and a connecting member 90 which is pivotally mounted to the adapter base and receives the connecting element (wiper arm) from the vehicle to mount the wiper blade assembly to the vehicle. The adapter base 62 includes a floor 64. A pair of forward slides 68 and a pair of rear slides 70 extend downwardly from the bottom of the floor 64. The slide of each pair of slides is positioned on opposite sides of the base floor 64. As seen, each slide 68, 70 includes a finger 68a, 70a extending downwardly from the bottom of each slide. As best seen in FIG. 11, the fingers 68a, 70a are reinforced with internal ribs. The slides 68, 70 are spaced apart from each other to be received in the wells 46 of the base member 30. The slides 68, 70 each have a length shorter than the length of the wells, to allow for the adapter base 62 to move axially relative connector assembly base 30, as will be described more fully. The fingers 68a, 70a are sized to extend down into the deeper side portions 46b of the wells 46.

A pair of side walls 72 extends upwardly from the floor 64 slightly inwardly from the side edges of the floor 64 below. The side walls 72 are generally coplanar with the slides 68, 70. The sidewalls 72 are joined at the rear by an upper connector 74. A generally vertical rear projection 76 extends from the back of the base between the upper connector 74 and the floor 64. The rear projection defines a rearwardly, and slightly downwardly, facing mouth 78. The adapter base 62 additionally includes a generally horizontal projection 80 extending forwardly from the front of the side walls 72. The end of the forward projection 80 is generally rounded and slightly upturned. Lastly, the adapter base 62 includes aligned arced cutouts 82 and a tube or axle 84 extending between (and slightly beyond the outer surface of) the side walls 72.

The connecting member 90 is comprised of a connecting body 90a and a cap 90b. Although preferably formed as two pieces, for reasons to be explained below, the connecting member can be made as a unitary, one-piece element. The connecting body 90a has a pair of side walls 92. A mounting hole 94 is formed in each wall 92. Walls 96a,b are immediately in front of and behind the mounting hole, and span the distance between the side walls 92. A front spacer also spans the distance between the side walls 92. The walls 96a,b and 98 space the side walls 92 apart a sufficient distance such the side walls will surround the adapter base walls 72. The mounting holes are aligned (i.e., are coaxial), and are sized to receive the axle 84, so that the body 90a can pivot relative to the adapter base 62. A second hole 100 is formed in each side wall 92 slightly rearwardly of, and below, the mounting hole 94. The holes 100 are positioned to be aligned with the cutouts 82 in the adapter base side walls 72. When the adapter is assembled, the holes 100 and the cutouts 82 will be aligned to define a hole through the connection adapter 60. This hole (i.e., the connector body hole 100 and the adapter base cutout 82) is sized to receive the pin arm of a pin arm type wiper arm of the vehicle. A flexible lock arm 102 extends rearwardly from the wall 96b. The lock arm includes an arced surface 104 positioned at an upper rear portion of the hole 100. The lock arm will engage the wiper arm's pin arm to secure the wiper assembly 10 to the wiper arm.

To mount the body 90a to the adapter base 60, the body 90a is pressed over the adapter base 62 until the mounting holes 94 snap into place about the axle 84. As can be appreciated, this requires the body 90a to be slightly flexible. The cap 90b is mounted to the front of the body 90a after the body has been positioned on the adapter base 62 to stiffen the body 90a to prevent the body 90a from inadvertently becoming disassociated from the adapter base 62. The cap 90b includes a top 110 and sidewalls 112 extending downwardly from the top. Slots 114 at the front of the cap 90b receive upwardly extending projections 116 towards the front of the sidewalls 92 of the adapter body 90a. Additionally, the cap includes inwardly projecting nubs 118 at the front of the cap which are received in openings 120 at the front of the adapter body side walls 92. The cap includes a slot 122 in the sidewalls 112 though which a forwardly extending projection 124 of the body sidewalls extend. To mount the cap 90b to the body 90a, the cap is slid rearwardly over the body, until the cap nubs 118 are received in the body holes 120, and the body projections 124 extend through the slots 122 in the cap. As can be appreciated, the adapter cap 90b will substantially stiffen the adapter body 90a to prevent inadvertent disassociation of the connecting member 90 from the adapter base 62.

To mount an assembled adapter 60 to the connector assembly base 30, the adapter 60 is initially held at an angle over the connector assembly base 30. The forward projection 80 of the adapter base 62 is positioned under the forward capture element 50, and the adapter is pivoted downwardly until it stops. At this point, the generally vertical rear projection 76 of the adapter base will be positioned between the fingers 52c of the connection assembly base's rear capture member 52, and the mouth 78 will be aligned with the bar 56a of the lock member 56. The lock member is then moved forwardly to engage the mouth 78. As noted above, the mouth is angled slightly downwardly. Thus, the lock member effectively snaps into place in the mouth to lock the adapter 60 to the connector assembly base 30. The snap connection of the lock 56 with the mouth 78 of the adapter base substantially prevents inadvertent disassociation of the connector assembly adapter from the connector assembly base. The adapter 60 can be removed by sliding the lock rearwardly, and simply pivoting the adapter out of the connector assembly base 30.

A second connection adapter 130 is shown in FIGS. 13A-E. The connection adapter 130 is designed to be used with bayonet-type wiper arms. The connection adapter 130 includes an adapter base 132 and a connection member 134. The connection adapter 130 mounts to the connector base 30 in the same manner as the adaptor 60. The only difference is the connection of the connection member 134 to the connection base 132. Hence, the structure of the connection adapter base 132 which enables the adapter 130 to be mounted to the connector base 30 will not be described. The adapter base 132 includes a central wall 136 extending between the forward projection 80a and the rear projection 76a. A pair of opposed, aligned holes 138 are formed on the sides of the wall 136. Although the holes are separated, if desired, a through-hole could be formed.

The connection member 134 comprises a pair of inner side walls 140 joined by an inner top wall 142. The sidewalls are spaced apart a distance slightly greater than the width of the wall 136 of the adapter base 132. The walls 140 and 142 define a space sized to receive the central wall 136 of the adapter base 132. The inner side walls 140 each have an inwardly directed nub 144 which snappingly engages the holes 138 to mount the connection member 134 to the adapter base 132. Elongate ribs 146 extend lengthwise of the outer surface of the inner side walls 140, and a pair of ribs 148 extend lengthwise of the top wall 142 to define a channel therebetween. Outer sidewalls 150 are joined to the inner sidewalls 140 by way of a bottom 152 and are joined at their tops by a top wall 154. The top wall defines a slot 156 above the channel formed by the ribs 148. A flexible tab 158 extends rearwardly from the top wall 154. The connection member receives a bayonet-type wiper arm in a well-known manner.

Figure 14A:
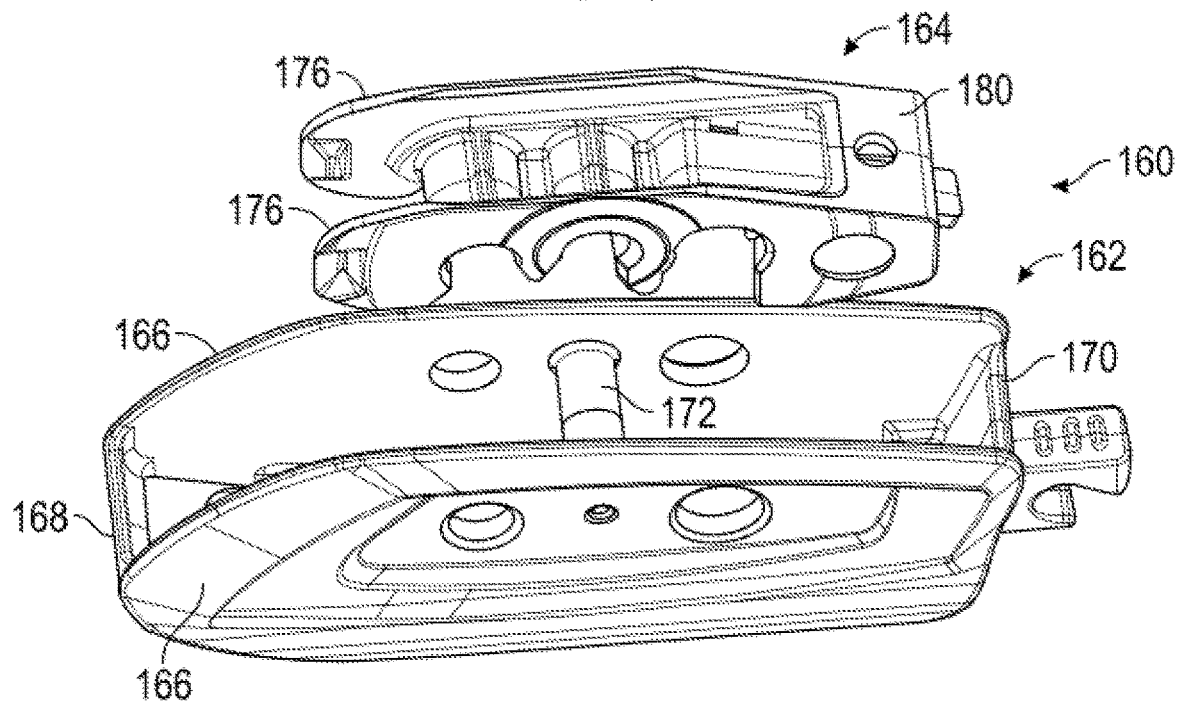
FIGS. 14A-B are exploded top and bottom perspective views of a third connection adapter adapted to receive bayonet-type or hook-type and side pin type wiper arms.
Figure 14B:
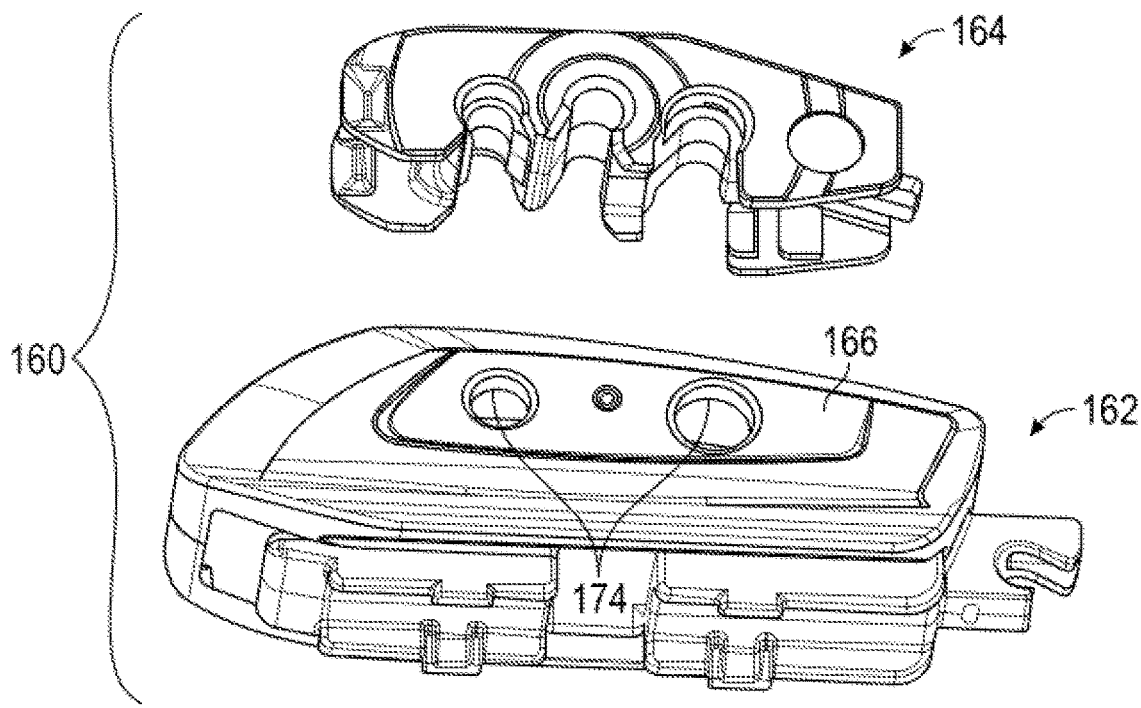
Figure 14C:
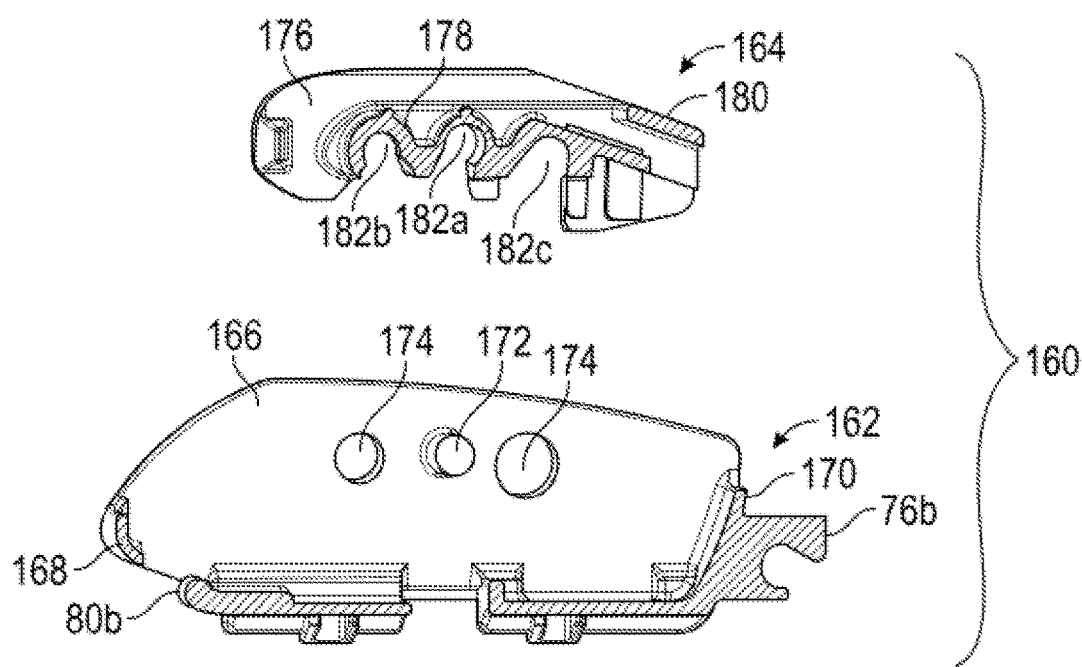
FIG. 14C is an exploded cross-sectional view of the third connection adapter.
Figure 15A:
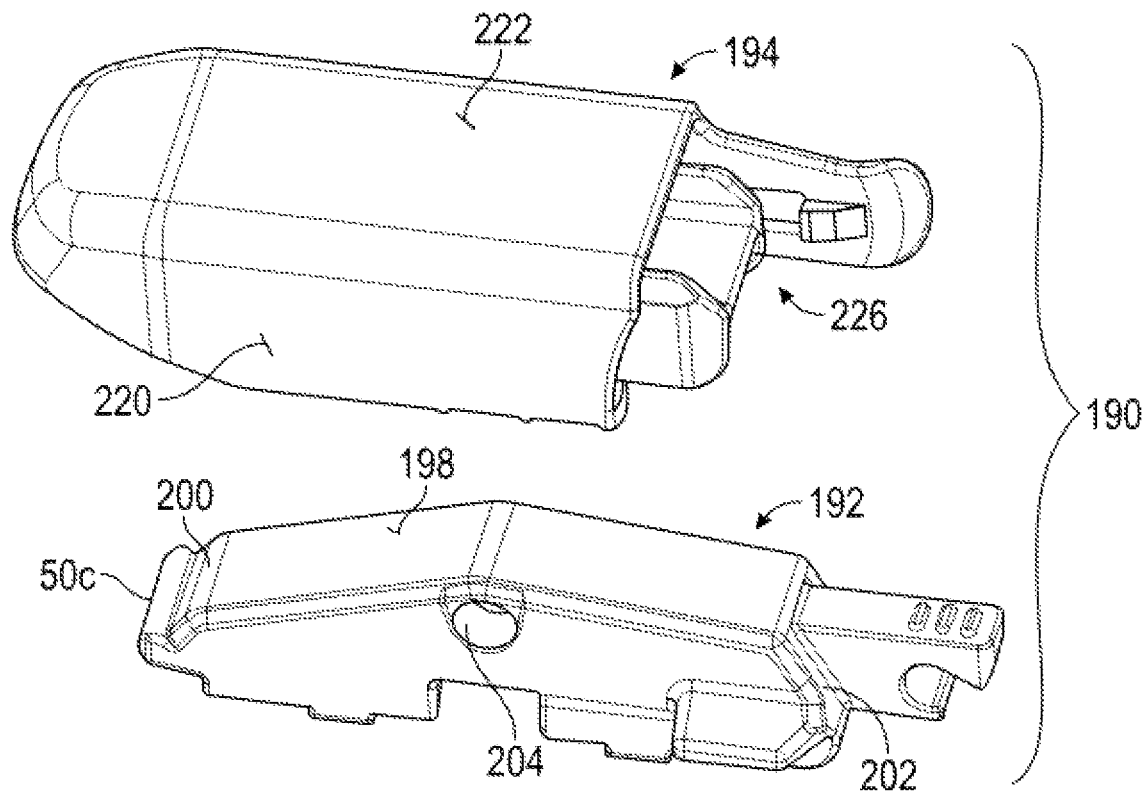
FIGS. 15A-B are exploded top and bottom perspective views of a fourth connection adapter adapted to receive a pinch tab wiper arm.
Figure 15B:
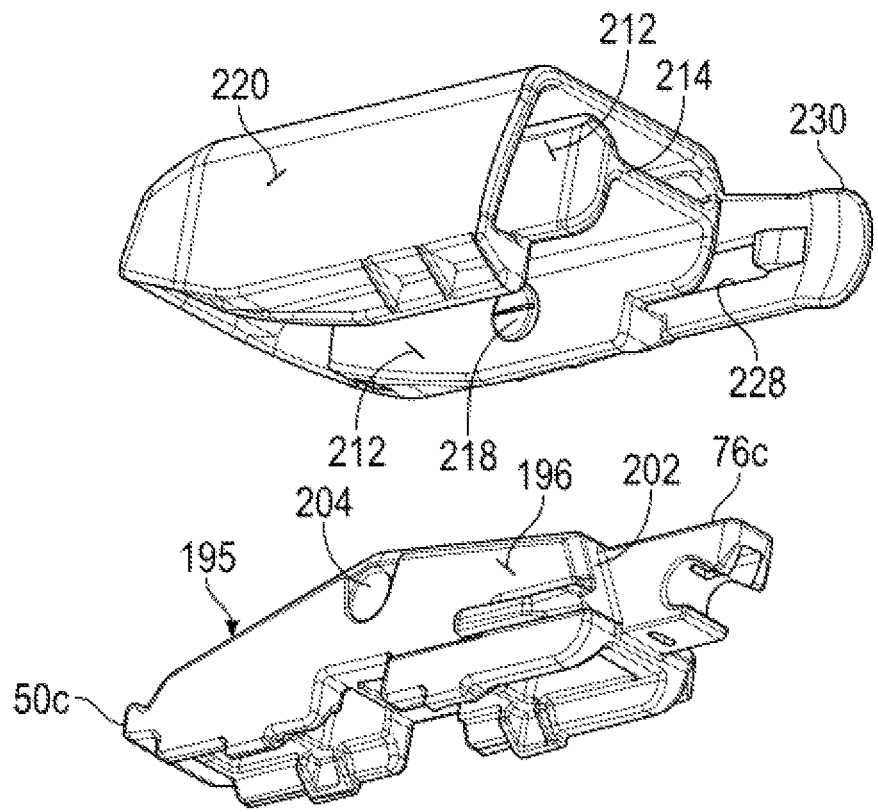
Figure 15C:
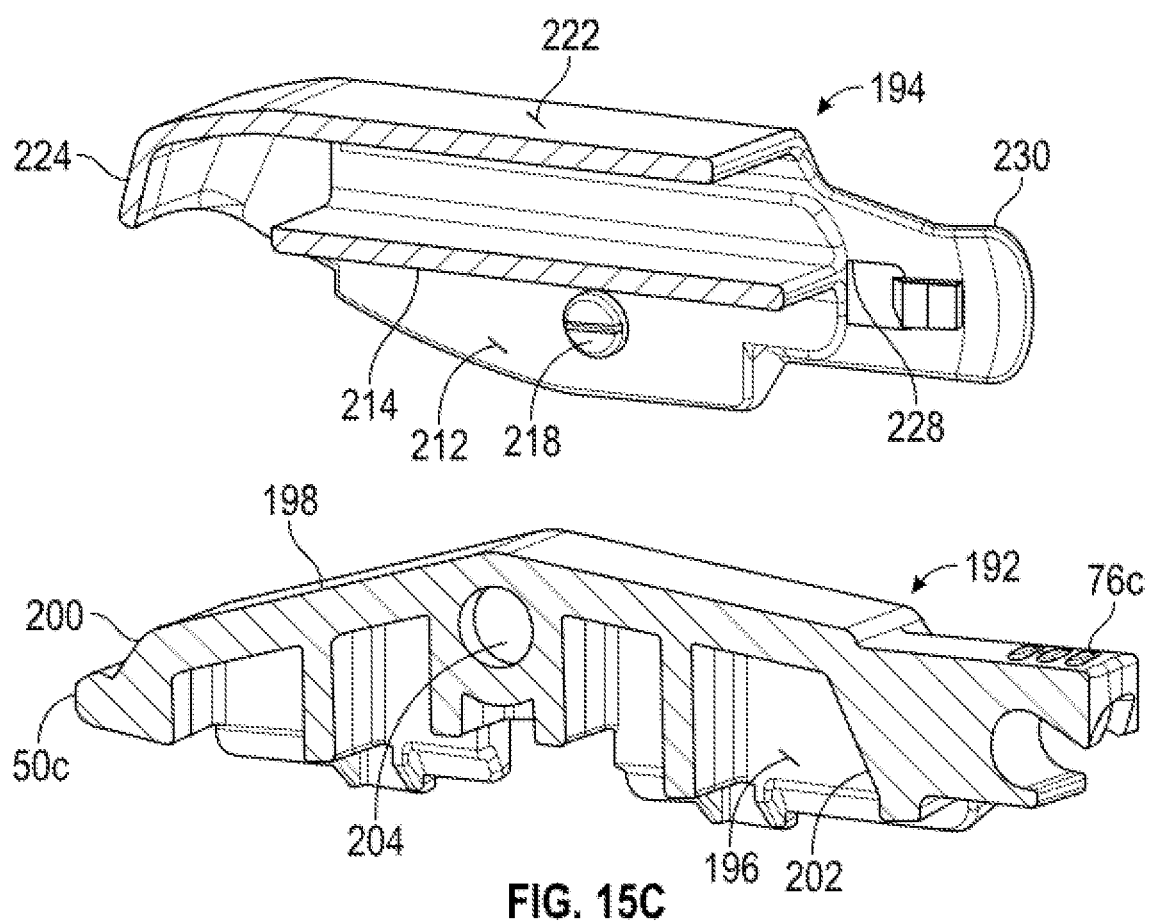
FIGS. 15C-D are exploded cross-sectional views of the fourth connection adapter taken at right angles relative to each other.
Figure 15D:
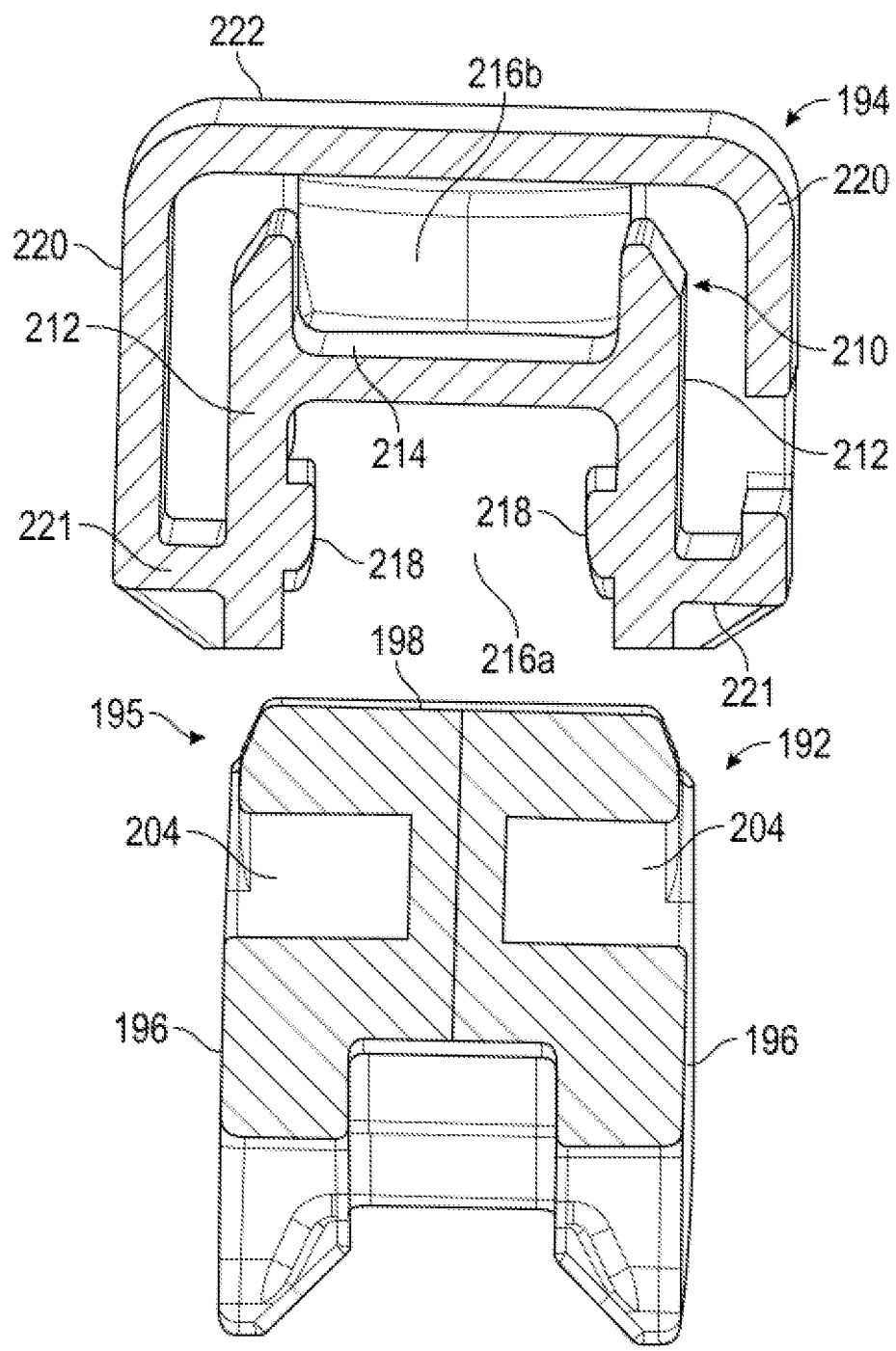
Figure 15E:
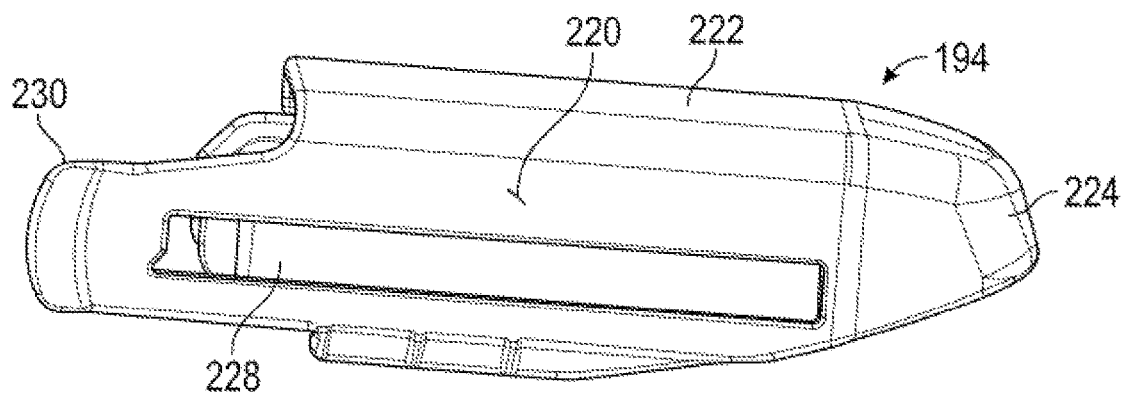
FIG. 15E is a side perspective view of a connection member of the fourth connection adapter.

A third adapter 160 is shown in FIGS. 14A-C. The connection adapter 160 is designed to be used with hook-type wiper arms. The connection adapter 160 includes an adapter base 162 and a connection member 164. The connection adapter 160 mounts to the connector base 30 in the same manner as the adaptor 60. The only difference is the connection of the connection member 164 to the adapter base 162. Hence, the structure of the connection adapter base 162 which enables the adapter 160 to be mounted to the connector base 30 will not be described. The adapter base 162 includes a pair of opposed side walls 166 which are joined by a front spacer 168, a rear wall 170, and an axle 172 about midway between the front spacer and rear wall. The forward projection 80a which is positioned under the forward capture element 50 is positioned behind the forward spacer 168. The rear projection 76b which is received by the rear capture element extends from the rear wall 170. A pair of holes 174 is formed on each wall 166, with one hole in front of, and the other behind, the axle 172.

The connector member 164 comprises a pair of side walls 176 spaced apart by a bottom wall 178 and a spacer 180 extending between the tops of the side walls 176 at a rear of the side walls. The side walls 176 define three cutouts 182a-c along the bottom edge of the side walls. The bottom wall 178 is shaped to conform to the shape of the cutouts. As seen in the cross-sectional view of FIG. 14C, the bottom surface 178 extends rearwardly and downwardly from the back of the third cutout 182c. The cutout 182a is a middle cutout and has an upper end which defines an arc of more than 180° and a lower end defined by inwardly sloping edges which lead into the upper end. The upper end is sized and shaped to be snappingly received on the axle 172 of the adapter body 162, such that the connector member 164 can pivot about the axle 172. The cutout 182b is positioned forward of the middle cutout 182a such that it will be aligned with the forward opening 174 in the adapter body 162. The cutout 182c is spaced rearwardly of the middle cutout 182a such that it will be aligned with the rear opening 174 in the adapter body 162. The spacer 180 at the back of the connecting member 164 is spaced above the rear portion of the bottom wall 178 to define a rear opening in the connecting member 164 to, for example, receive the end of a bayonet-type or hook-type wiper arm.

A fourth connection adapter 190 is shown in FIGS. 15A-D. The connection adapter 190 is designed to be used with side-lock wiper arms. The connection adapter 190 includes an adapter base 192 and a connection member 194. The connection adapter 190 mounts to the connector base 30 in the same manner as the adaptor 60. The only difference is the connection of the connection member 194 to the adapter base 192. Hence, the structure of the connection adapter base 192 which enables the adapter 190 to be mounted to the connector base 30 will not be described. The adapter base 192 includes a central body 195 having side walls 196, a top 198, a forward wall 200 and a rear wall 202. The front and rear capture elements 50c, 76c extend from the front wall 200 and rear wall 202, respectively. The central body 195 further includes a hole 204 in each of the side walls 196. The holes 204 are coaxial and aligned. They can be divided or separated from each other, or they can define a continuous opening through the central body 195.

The connection member 194 includes an inner portion 210 comprised of a pair of opposed side walls 212 and a horizontal wall 214 extending between the side walls below the upper edge of the side walls. In combination, the side walls and horizontal wall define a lower chamber 216a and an upper chamber 216b. Nubs 218 extend from the inner surfaces of the side walls. The nubs 218 are sized and shaped to be received in the holes 204 to mount the connection member 194 to the adapter central body 192 such that the connection member 194 can pivot about the nubs 218 relative to the central body 195. The connection member 194 further includes outer side walls 220 connected to the inner side walls by lower walls 221, a top surface 222, and a front wall 224. The connection member 194 is open at its rear 226. An elongate slot 228 is formed in one of the outer side walls 220. The outer side wall with the slot 228 further includes a flexible tab 230 extending from the rear edge of the outer side wall. As seen, the slot 228 extends into the tab 230. As is known, the wiper arm can be inserted into the connection member 194 through the back end 226 to mount a wiper blade assembly to the wiper arm.

Figure 16A:
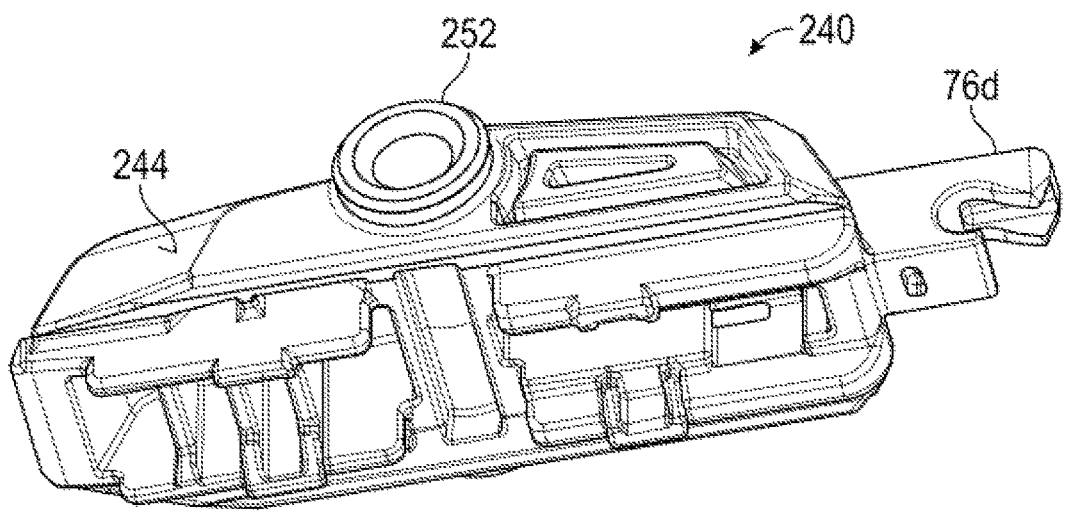
FIGS. 16A-C are bottom, top, and rear perspective views of a fifth connection adapter for use with a side-lock wiper arm.
Figure 16B:
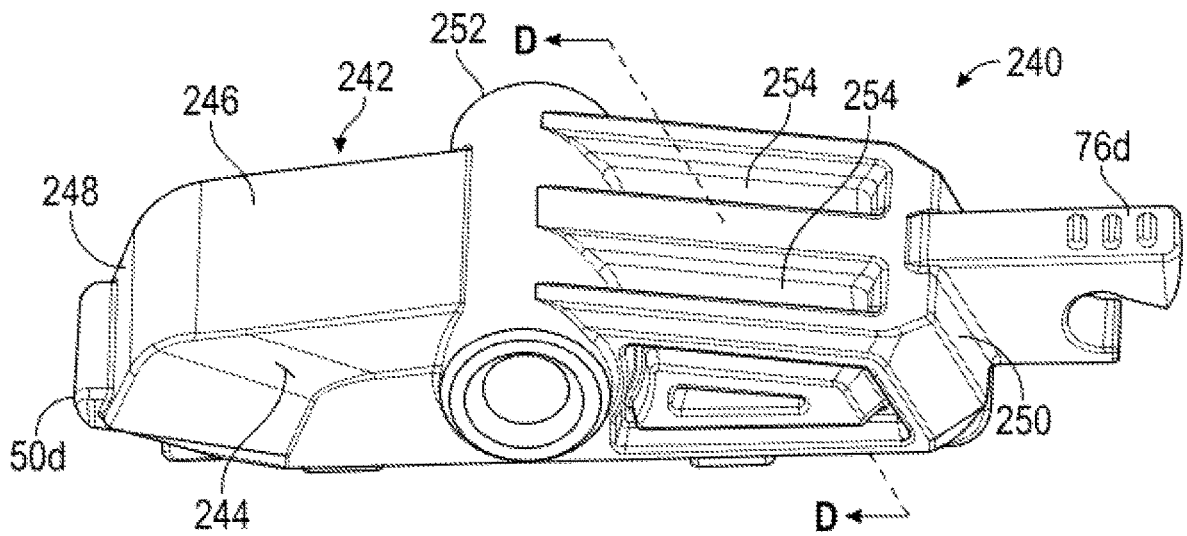
Figure 16C:
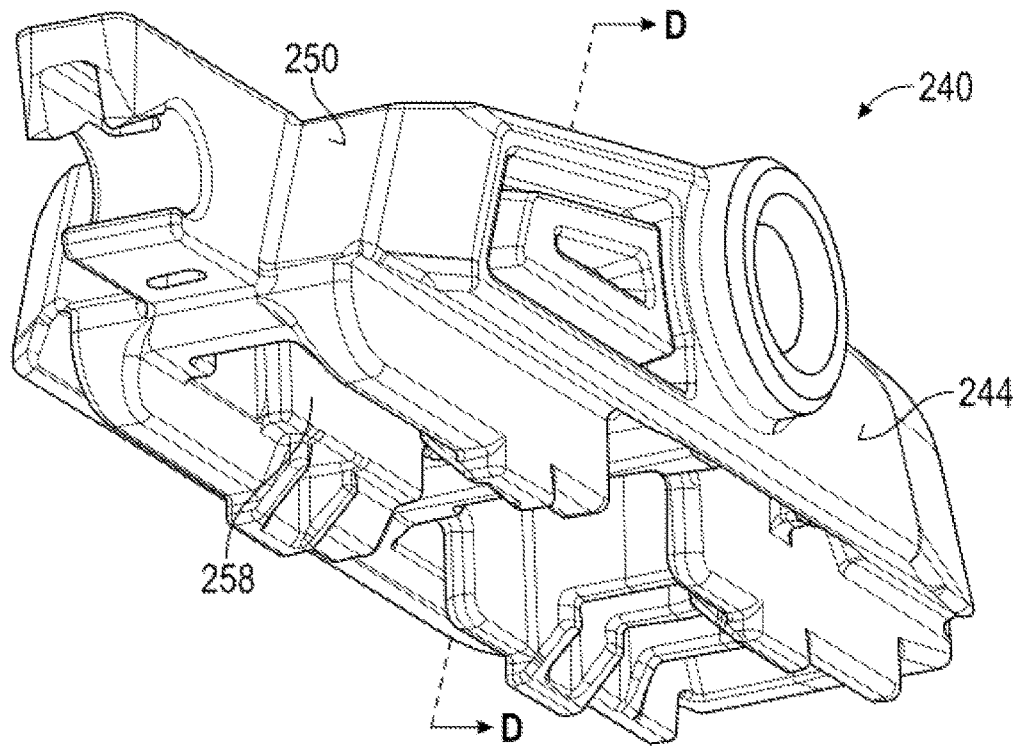
Figure 16D:
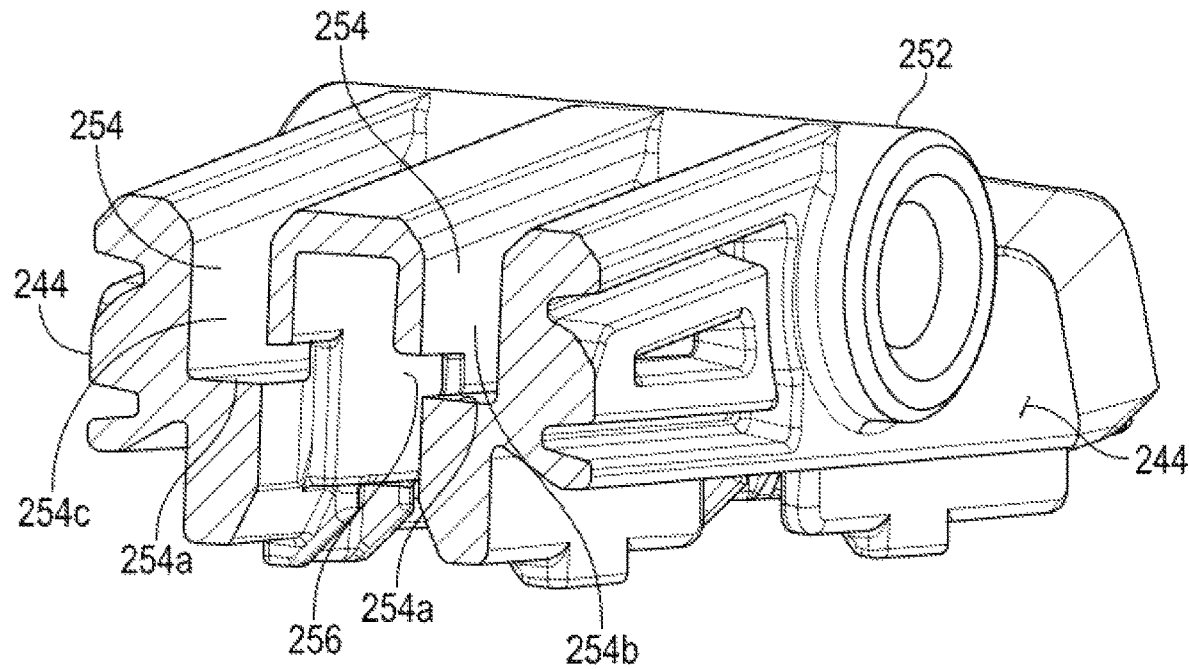
FIG. 16D is a perspective cross-sectional view of the fifth connection adapter taken along line D-D of FIGS. 16B and 16C.

A fifth connection adapter 240 is shown in FIGS. 16A-D. The connection adapter 240 is designed to be used with side-lock type wiper arms. Unlike the previously described connection adapters, the connection adapter 240 is a one-piece connection adapter. The connection adapter 240 mounts to the connector base 30 in the same manner as the adaptor 60. The connection adapter 240 includes a connection body 242 having opposed side walls 244, a top 246, a front wall 248, and a rear wall 250. The front and rear capture elements 50d, 76d extend from the front wall 248 and rear wall 250, respectively. The hollow tube 252 protrudes from the top surface 246 and extends across the body at the approximate center of the body. As seen, the tube 252 extends slightly beyond the side walls 244 of the body 242. In the rear half of the body 242, the adapter 240 includes a pair of slots 254 extending downwardly from the top surface and extending between the tube 252 and the rear wall 250. As seen in FIG. 16D, the slots 254 are defined by a floor 254a, an inner wall 254b, and an outer wall 254c. An opening 256 is formed in the inner wall 254b of each slot 254 such that the slot 254 communicates with a central area 258 of the adapter 240.

As can be appreciated, wiper blade assembly provides several benefits over currently existing wiper blade technology. In one aspect, the wiper blades will prevent, or at least discourage, reconnection of the spoiler to the wiper blade if the spoiler is removed from the wiper blade. The inability to properly reconnect the spoiler to the wiper blade will reduce the likelihood that a user will reattach the spoiler to the wiper blade. In another aspect, the connection assembly comprises a universal connection base and a series of different adapters which can be selectively attached to the connection base. This can reduce manufacturing costs and can provide distributors and retailers more flexibility in the sale of the wiper blades. For example, wiper blades with the universal connection bases can be supplied separately from the adapters. Thus, a customer can select the wiper blade length needed and separately select the correct adapter for the customer's vehicle.

As various changes could be made in the above constructions without departing from the scope of the invention, it is intended that all matter contained in the above description or shown in the accompanying drawings shall be interpreted as illustrative and not in a limiting sense. Although the wiper blade is shown to include both aspects, it will be apparent that wiper blades could be provided with just one of the aspects.

The invention claimed is:

1. A wiper blade assembly for the windshield of a vehicle, the wiper blade assembly comprising a blade having upper and lower major surfaces; a wiper element mounted to the blade to extend from the lower major surface to engage the vehicle windshield when in use, a connector mounted to the blade on the upper major surface of the blade; a first spoiler extending from a first end of the connector and a second spoiler extending from a second end of the connector;
   wherein, the connector includes sleeves which extend from opposite sides of the connector, and said spoilers each include an inner portion; said spoiler inner portion and said connector sleeve being telescopically connected; said spoiler inner end including at least one recess on at least one edge of said spoiler inner portion, and said connector includes at least one finger extending from a wall of said connector sleeve into said recess; and wherein the wiper blade assembly further includes a slice extending from said at least one recess into said spoiler; whereby, if the spoiler is moved axially along said blade away from said connector, a tear will form in said spoiler which will interfere with the ability to securely remount the spoiler to the blade.

2. The wiper blade assembly of claim 1 wherein said spoiler inner portion is received within said connector sleeve.

3. The wiper blade assembly of claim 1 wherein said spoiler includes a mounting body comprising an upper portion and a lower portion joined by an edge portion which in combination define an internal elongate slot, said slot being sized to receive the blade; and wherein said at least one recess is formed in said lower portion of said mounting body.

4. The wiper blade assembly of claim 1 wherein said at least one recess comprises at least one pair of recesses, each recess of said at least one pair of recesses being formed on opposite sides of said spoiler inner portion.

* * * * *